United States Patent
Tatomirescu et al.

(10) Patent No.: US 10,498,030 B2
(45) Date of Patent: Dec. 3, 2019

(54) FREQUENCY RECONFIGURABLE ANTENNA DECOUPLING FOR WIRELESS COMMUNICATION

(71) Applicant: Intel IP Corporation, Santa Clara, CA (US)

(72) Inventors: Alexandru Daniel Tatomirescu, Aalborg (DK); Simon Stanev, Aalborg (DK); Emil Buskgaard, Aalborg (DK); Gert F. Pedersen, Storvorde (DK); Pevand Bahramzy, Norresundby (DK); Simon Svendsen, Aalborg (DK); Boyan Yanakiev, Aalborg (DK); Ole Jagielski, Frederikshavn (DK)

(73) Assignee: Intel IP Corporation, Santa Clara, CA (US)

( * ) Notice: Subject to any disclaimer, the term of this patent is extended or adjusted under 35 U.S.C. 154(b) by 645 days.

(21) Appl. No.: 15/193,958

(22) Filed: Jun. 27, 2016

(65) Prior Publication Data

US 2017/0373393 A1    Dec. 28, 2017

(51) Int. Cl.
*H01Q 1/24* (2006.01)
*H01Q 21/00* (2006.01)
(Continued)

(52) U.S. Cl.
CPC ............ *H01Q 5/328* (2015.01); *H01Q 1/243* (2013.01); *H01Q 1/48* (2013.01); *H01Q 1/521* (2013.01);
(Continued)

(58) Field of Classification Search
CPC ............ H01Q 1/243; H01Q 1/48; H01Q 1/38; H01Q 1/24; H01Q 21/00; H01Q 5/328;
(Continued)

(56) References Cited

U.S. PATENT DOCUMENTS 5,841,401 A * 11/1998 Bodley ............... H01Q 1/246
343/700 MS
6,040,803 A * 3/2000 Spall ................... H01Q 1/243
343/700 MS (Continued)

OTHER PUBLICATIONS

Jensen, Michael A. et al. "A Review of Antennas and Propagation for MIMO Wireless Communications," IEEE Transactions on Antennas and Propagation, vol. 52, No. 11, Nov. 2004, pp. 2810-2824.

(Continued)

*Primary Examiner* — Tho G Phan
(74) *Attorney, Agent, or Firm* — Eschweiler & Potashnik, LLC

(57) ABSTRACT

Cellular antennas having a mutual coupling can be isolated by the generation of an additional current path along a ground plane. A first antenna element can resonate at a resonance that interferes with and is mutually coupled to a second antenna element operating in a same frequency range, such as a low band frequency range. One or more parasitic scattering elements can generate the additional current path between the two antennas and isolate the two antennas from one another. A parasitic scattering element can comprise two capacitors that alter a radiation pattern of one of the antennas and decrease a correlation between both antennas.

16 Claims, 18 Drawing Sheets

(51) Int. Cl.
*H01Q 5/328* (2015.01)
*H01Q 1/48* (2006.01)
*H04W 72/04* (2009.01)
*H01Q 1/52* (2006.01)
*H01Q 21/28* (2006.01)
*H01Q 5/385* (2015.01)

(52) U.S. Cl.
CPC .............. *H01Q 5/385* (2015.01); *H01Q 21/00* (2013.01); *H01Q 21/28* (2013.01); *H04W 72/042* (2013.01); *H04W 72/0413* (2013.01)

(58) Field of Classification Search
CPC ........ H01Q 1/521; H01Q 21/28; H01Q 5/385; H04W 72/0413; H04W 72/042
See application file for complete search history.

(56) References Cited

U.S. PATENT DOCUMENTS

| | | | | |
|---|---|---|---|---|
| 6,429,818 | B1* | 8/2002 | Johnson | H01Q 1/243 343/700 MS |
| 8,217,850 | B1* | 7/2012 | Jennings | H01Q 3/26 343/722 |
| 8,531,341 | B2 | 9/2013 | Schiub et al. | |
| 8,947,318 | B2 | 2/2015 | Bungo | |
| 9,331,397 | B2* | 5/2016 | Jin | H01Q 21/28 |
| 9,379,433 | B2 | 6/2016 | Ying | |
| 9,812,770 | B2* | 11/2017 | Gavilan | H01Q 1/50 |
| 2005/0110692 | A1* | 5/2005 | Andersson | H01Q 1/243 343/702 |
| 2013/0244593 | A1 | 9/2013 | Alrabadi et al. | |
| 2014/0159981 | A1 | 6/2014 | Wang | |
| 2015/0380818 | A1 | 12/2015 | Svendsen et al. | |

OTHER PUBLICATIONS

Vaughan, Rodney G. et al. "Antenna Diversity in Mobile Communications." IEEE Transactions on Vehicular Technology, vol. VT-30, No. 4, Nov. 1987, pp. 149-172.
Foschini, G.J. et al. "On Limits of Wireless Communications in a Fading Environment when Using Multiple Antennas." Wireless Personal Communications 6: 311-335, 1998.
Ying, Zhinong. "Antennas in Cellular Phones for Mobile Communications," Proceedings of the IEEE, vol. 100, No. 7, Jul. 2012, pp. 2286-2296.
Ban, Yong-Ling et al. "Decoupled Hepta-Band Antenna Array for WWAN/LTE Smartphone Applications," IEEE Antennas and Wireless Propagation Letters, vol. 13, 2014, pp. 999-1002.
Zhu, Jiang et al. "A Simple Approach for Reducing Mutual Coupling in Two Closely Spaced Metamaterial-Insipired Monopole Antennas." IEEE Antennas and Wireless Propagation Letters, vol. 9, 2010, pp. 379-382.
Li, Hui et al. "A Compact Planar MIMO Antenna System of Four Elements With Similar Radiation Characteristics and Isolation Structure." IEEE Antennas and Wireless Propagation Letters, vol. 8, 2009, pp. 1107-1110.
Li, Hui et al, "Design of Orthogonal MIMO Handset Antennas Based on Characteristic Mode Manipulation at Frequency Bands Below 1 GHz." IEEE Transactions on Antennas and Propagation, vol. 62, No. 5, May 2014, pp. 2756-2768.
Miers, Zachary et al. "Design of Multi-Antenna Feeding for MIMO Terminals Based on Characteristic Modes," AP-S-2013, 2013 IEEE, pp. 182-183.
Tang, Xinyi et al. "Tunable Decoupling and Matching Network for Diversity Enhancement of Closely Spaced Antennas," IEEE Antennas and Wireless Propagation Letters, vol. 11, 2012, pp. 268-271.
Lau, Buon Kiong et al. "Impact of Matching Network on Bandwidth of Compact Antenna Arrays." IEEE Transactions on Antennas and Propagation, vol. 54, No. 11, Nov. 2006, pp. 3225-3238.
Li, Yue et al. "Design of Dual-Polarized Monopole-Slot Antenna With Small Volume and High Isolation." IEEE Transactions on Antennas and Propagation, vol. 60, No. 5, May 2012, pp. 2511-2514.
Zhang, Shuai et al. "Closely-Packed UWB MIMO/Diversity Antenna With Different Patterns and Polarizations for USB Dongle Appiications," IEEE Transactions on Antennas and Propagation, vol. 60, No. 9; Sep. 2012, pp. 4372-4380.
Zhang, Shuai et al. "Reduction of the Envelope Correlation Coefficient with Improved Total Efficiency for Mobile LTE MIMO Antenna Arrays: Mutual Scattering Mode," IEEE Transactions on Antennas and Propagation, vol. 61, No. 6, Jun. 2013, pp. 3280-3291.
Cihangir, Aykut et al., "Neutralized Coupling Elements for MIMO Operation in 4G Mobile Terminals," IEEE Antennas and Wireless Propagation Letters, vol. 13, 2014; pp. 141-144.
Diallo, Aliou et al. "Study and Reduction of the Mutual Coupling Between Two Mobile Phone PIFAs Operating in the DCS1800 and UMTS Bands." IEEE Transactions on Antennas and Propagation, vol. 64, No. 11, Nov. 2006, pp. 3063-3073.
Lau, Buon Kiang et al. "Simple and Efficient Decoupling of Compact Arrays with Parasitic Scatterers." IEEE Transactions on Antennas and Propagation, vol. 60, No. 2, Feb. 2012, pp. 464-472.
Mak, Angus C.K. et al. "Isolation Enhancement Between Two Closely Packed Antennas." IEEE Transactions on Antennas and Propagation, vol. 56, No. 11, Nov. 2008, pp. 3411-3419.
Payandehjoo, Kasra et al. "Compact Multi-Band PIFAs on a Semi-Populated Mobile Handset with Tunable Isolation." IEEE Transactions on Antennas and Propagation, vol. 61; No. 9, Sep. 2013, pp. 4814-4819.
Tatomirescu, Alexandru et al. "User Body Loss Study for Popular Smartphones." Antennas, Propagation and Radio Networking section at the Department of Electronic Systems, Faculty of Engineering and Science, Aalborg University, Denmark, pp. 1-4, undated.
Payandehjoo; Kasra et al. "Investigation of Parasitic Elements for Coupling Reduction in MultiAntenna Hand-Set Devices," 2013 Wiley Periodicals, Inc. pp. 1-10.
Lim, Jong-Hyuk et al. "Simultaneous Frequency and Isolation Reconfigurable MIMO PIFA Using PIN Diodes." IEEE Transactions on Antennas and Propagation, vol. 60; No. 12, Dec. 2012, pp. 5939-5946.
Stanev, Simon et al. "Double Resonance Tunable Decoupling of Tri-band LTE700/GSM850/900 Monopole Antenna with a Parasitic Scatterer for Handheld Devices." Journal of Latex Class Files, vol. 11, No. 4, Dec. 2012, pp. 1-9.
Extended European Search Report dated Oct. 25, 2017 for EP Application 17173159.9-1927.

* cited by examiner ence to the attached drawing figures, wherein like reference numerals are used to refer to like elements throughout, and wherein the illustrated structures and devices are not necessarily drawn to scale. As utilized herein, terms "component," "system," "interface," and the like are intended to

FREQUENCY RECONFIGURABLE ANTENNA DECOUPLING FOR WIRELESS COMMUNICATION

FIELD

The present disclosure is in the field of wireless communications, and more specifically, pertains to an antenna configuration with one or more decouplers for wireless communications.

BACKGROUND

The number of antennas utilized in modern wireless devices (e.g. smartphones) are increasing in order to support new cellular bands, with bands now ranging between 600 MHz to 3800 MHz, multiple-input multiple-output (MIMO), diversity, carrier aggregation, wireless local area networks (WLANs), near field communication (NFC), global navigation satellite systems (GNSS), or other radio communication technologies, for example, which poses a challenge due to the volume or space required for each antenna to achieve good performance. For example, the performance of antennas in mobile devices is (among others) related to the volume or space allocated and the physical placement in the mobile device, such as a mobile phone. Increasing the allocated volume for the antenna can result in better antenna performance, for example, in terms of the reflection coefficient and/or the radiated efficiency. The width of the display is often nearly as wide as the smartphone itself, batteries take up a considerable volume inside the mobile device housing, and the available volume for antennas especially close to the outer casing of the housing is very limited and in many cases not usable for antennas also as a result of coupled interference. Other components like the USB connector, the audio jack and different user control buttons, are normally also placed at the outer casing of the housing, reducing the available volume for the antenna within the housing even more. Therefore, it is desired to provide antenna modules with low volume consumption and good performance for wireless communication devices.

In order to achieve high data rate and improve the radio link performance a wide spread adoption of MIMO technology is being utilized in the long term evolution (LTE) standards. MIMO antennas utilize the richness of the multipath wireless channel to enable multiple parallel data streams; nonetheless, they can rely on independent channel realizations. However, in a mobile phone bellow 1 GHz, the antenna elements are electrically small and rely on the ground plane to radiate efficiently. The sharing of the ground plane results in naturally strongly coupled elements, which can lead to reduced total efficiency (TE) and very high envelope correlation coefficient (ECC) due to similar radiation patterns, and thus poor MIMO performance. According to industrial research reports, an ECC less than 0.5 and a total efficiency higher than 40% can be rules of thumb for designing cellular LTE MIMO antennas in the lower bands. Thus, it is crucial to mitigate the mutual coupling and develop an adequate isolation mechanism that can be reliable, versatile and practical.

DETAILED DESCRIPTION

Figure 1:
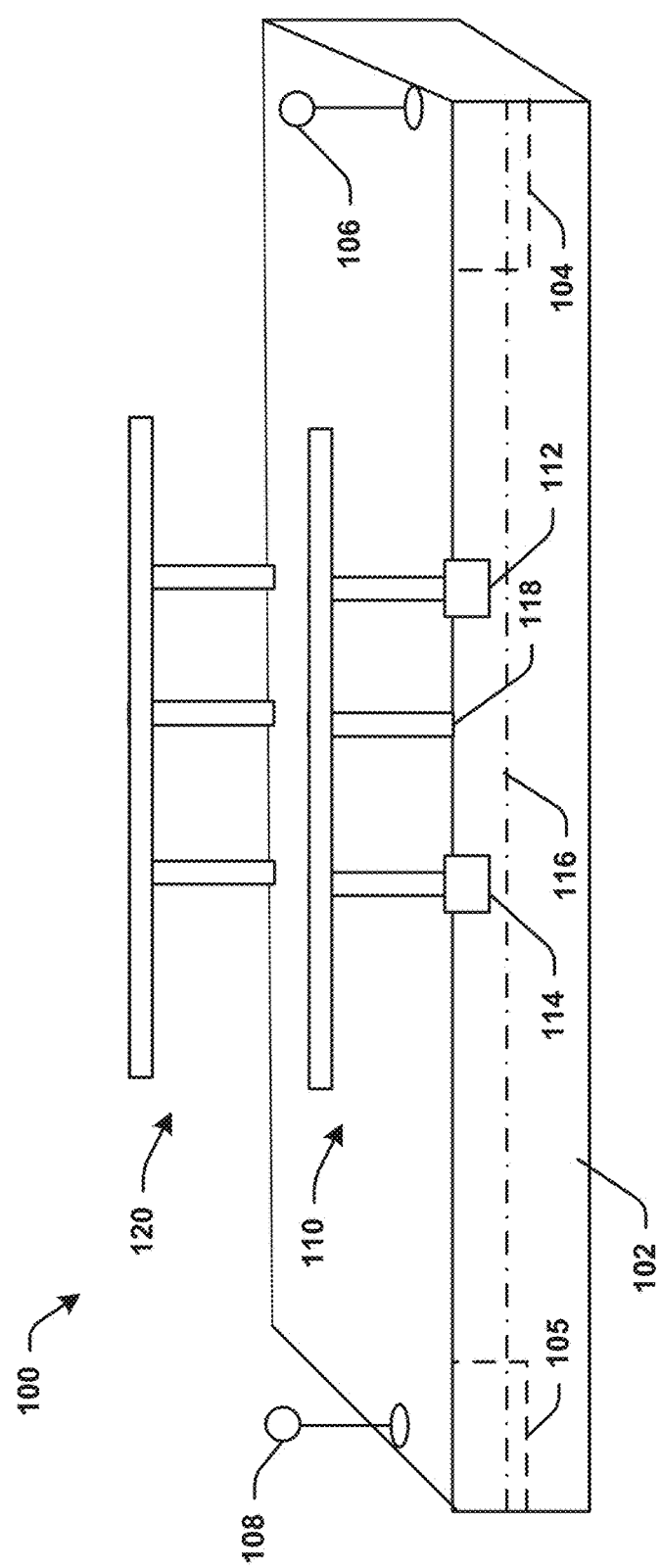
FIG. 1 is a block diagram illustrating an antenna system or device according to various aspects described.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

Introduction

A general introduction of the disclosure is provided below with more detailed embodiments and aspects being described subsequently with reference to example figures. In consideration of the above described deficiencies of radio frequency communications, various aspects for mobile devices using wireless radio communications to utilize at least one of carrier aggregation, diversity reception or transmission, reception or transmission with directional characteristics, MIMO, NFC, GNSS or various other communication operations with antenna architectures including one or more decoupler elements (e.g., parasitic scatterers, or parasitic scattering elements) are disclosed. Antenna performance can be compromised when bad isolation properties are present among antenna elements of an antenna system. Without good isolation, antenna elements of a system can couple to one another and thus reduce the power, reception or transmission efficiency of one another. Isolation can be straightforward, if antenna elements of a system operate on different frequencies separated by a large frequency range of operation, or are separated from one another by a sufficient distance compared to the wavelength of operation.

In addition, the current state of the art mobile phones have antenna radiation losses in excess of 6 dB, which can make the mutual coupling in the worst case scenario −12 dB, for example. This does not affect the total efficiency (TE) significantly still, but the antennas are correlated. Aligning to the current needs from in the European Commission to introduce a phone RF performance labelling scheme, the future of mobile phone antennas could mean that a much higher efficiency is demanded thus requiring a reduction of the mutual coupling, which until now has been mitigated primarily by utilizing lossy antennas.

The antenna systems disclosed can include a parasitic scatterer (PS) the can decouples two simple monopole MIMO antennas working in a low band (e.g., LTE700/GSM850/900 or other low bands), which suffer from a strong mutual coupling due to excitation in a dipole-like radiaton mode at the ground plane or a metallic chassis. As such, a single PS with a capacitive component comprising a plurality (e.g., two or more) of distributed Micro-Electro Mechanical Systems (MEMS) capacitors can be utilized to match the impedance, suppress the effect of coupling, or change the radiation current and radiation pattern by creating an additional current path on the ground plane. The systems designed herein can have the advantage of flexiblity because the PS can be tuned for an entire frequency interval (e.g., 700-960 MHZ) with minimized losses. As a result, an increase of the TE and a reduction in the ECC can be realized.

In an aspect, an antenna system disclosed herein can comprise a plurality of antenna components, antenna elements or antenna ports coupled to one or more antenna components that resonant at a respective frequency within frequency ranges that can overlap, or match for example. The antenna architectures disclosed can comprise solutions for having a low band MIMO antenna system having different antenna elements within different volumes, in which a volume is further detailed herein and can comprise one or more portions, sections or subsets of a body (e.g., a substrate, printed circuit board, chassis or the like). A first antenna element comprising a low band antenna can be substantially located in a first volume of a body that is substantially opposite to a second antenna element in a second volume of the body, such as on an opposite end of a mobile device, for example.

These antenna elements can each comprise a monopole resonating element that faces or is connected to a parasitic scatterer or parasitic scattering element. Additionally, the monopole antennas, loop antennas, other types of antenna, or antenna ports can be joined by a coupler that joins the monopole resonating element and the parasitic resonating element to also cover a low band frequency range that is similar to or overlapping one another so that a mutual coupling occurs between the antenna elements. The parasitic scattering elements can operate to generate an additional current path via a ground plane of the body so that at least one of the antennas have a radiation pattern that is altered by a different phase or direction such as from vertical to a diagonal radiation, and as a result isolate the mutual coupling of the antennas. Further, the parasitic scattering elements do not block a coupling current path between the antennas, or act as a choke to the antennas, but rather are configured to operate as an extension of the one or more antennas, which can be monopole antennas, loop antenna or other type antennas, for example.

In an aspect, the first and second antenna elements or ports of different volumes of a mobile or wireless device (e.g., a user equipment (UE)) can each comprise a low band antenna that can be substantially located within different antenna volumes of a body that comprises a circuit board and a ground plane. A first antenna element can be a cellular low band antenna, for example, that can operate or resonate at a resonant frequency within a first resonant frequency range (e.g., about 700 MHz to about 960 MHz), while also operating to cover another channel as a narrow uplink band or narrow downlink band.

In addition, a second antenna can be substantially located within a different volume of the body, and be configured to operate at a second resonant frequency range or at a different frequency channel simultaneously, which can comprise a frequency within the first resonant frequency range also so that a mutual coupling occurs between the two antennas despite a physical separation. The second antenna can operate in a different narrow band within a different frequency division duplex so that if the first antenna element is operating in the downlink, then the second antenna element can operate in the uplink. The different frequency channels between the channels can be a narrow uplink band or narrow downlink band in the same range, either both operating in uplink, downlink, or both uplink and downlink independently so that each antenna can be receiving or transmitting at the same time. Additional aspects and details of the disclosure are further described below with reference to figures.

FIG. 1 illustrates an example of a wireless LTE communication system with an antenna system or device for wireless or antenna solutions to enable antenna resonant elements or components to operate at frequency ranges close to one another. The system 100 can be employed in or operate as a wireless device (e.g., a laptop, a tablet or other wireless communicating device have a processor and a memory) for communicating with at least one of carrier aggregation, diversity reception or MIMO operations, for example. The system 100 can facilitate the operation of multiple antennas within different volumes such as opposite portions or sections of volume in a device body 102, such as a circuit board having a ground plane 116.

For example, a first antenna port 106 can operate in one frequency range (e.g., a low frequency range of about 700 MHz to about 960 MHz, or a subset of the low frequency range) and can connect to a first antenna element (not shown), which can be fabricated opposite to or in a different volume with a second antenna port 108 that can connect to a second antenna element (not shown). The second antenna port 108 can be configured to connect to one or more antenna elements that can operate in similar frequency band range within a different volume 105 from the first antenna port 106.

The volumes 104 and 105 that the first and second antenna ports 106 and 108 are fabricated within, on, at, or reside along different portions or edges of the device, for example. These volumes 104, 105 of the antenna ports 106 and 108 can include a body or substrate within a printed circuit board or substrate. The volumes 104 and 105 can also comprise a fraction, section, portion or less than an entire volume of the body, such as by contacting less than all edges of the device (e.g., at about two or three dimensional edges), for example.

The system 100 comprises the body 102, the first antenna volume 104, the first antenna port 106, the second antenna port 108, and a coupler 110. The body 102 can comprise a circuit board, for example, with a ground plane 116. The body 102 can include a silicon body or other materials or metals that comprise at least a portion of a mobile or wireless device. The ground plane 116 can be fabricated at least partially within, below or above the body 102 of the circuit board and be the same shape or a different shape than the body 102. The first and second antenna ports 106 and 108 can operate as ports, connection points, or unions to one or more antenna components that can operate as resonant elements for wireless communications. The first and second antenna ports 106 and 108 can be coupled to the ground plane 116 of the body 102, or the circuit board, and correspond to, or designated to resonate for particular frequencies ranges for various mobile communications of one or more different networks, as discussed above.

For example, the first antenna port 106 can be designated for a cellular low band frequency network and operate within a low frequency bandwidth for communications via a cellular high band frequency network device (e.g., a base station, eNodeB device, or other network device) associated with a cellular network. Likewise, the second antenna port 108 can be designated to resonate in a similar frequency range with a different band.

Additionally, the first antenna port 106 can operate with a parasitic scatter or parasitic scattering element 110 for operation in a single channel for a downlink narrowband of operation, while the second antenna port 108 CAN concurrently operate with the parasitic scattering element 110 or a different parasitic scattering element 120 that can be located substantially opposite the body 102 and similar in structure. Due to the high level of integration and miniaturization of smartphones, for example, the different parasitic scattering elements 110 and 120 can be embedded within or integral to a casing (e.g., a metallic casing or chassis) around or enclosing the body 102.

In an aspect, the parasitic scattering element 110 can be narrowband and only cover operations/communications at one side of the communication band, either the downlink (Rx) or the uplink (Tx). While the parasitic scattering element 110 can cover downlink, the other parasitic scattering element could cover the uplink, or vice versa. As such, the FDD LTE frequency bands can be paired to allow simultaneous Rx and Tx transmission on two frequencies. The parasitic scattering element 110 can thus be configured to decouple two separate frequencies or frequency channels operating simultaneously or concurrently with at least two values of one or more capacitors (e.g., at least two MEMS capacitors 114 and 112 or other type capacitors) in between the antenna ports 106, 108 when monopole antennas, loop antennas or other antenna types are connected thereat and resonant with mutual coupling. The parasitic scattering element 120 can also be similarly structured for operation. Alternatively, only one parasitic scattering element 110 could be operational or present within the device 100 or body 102 of the device 100.

In an embodiment, the parasitic scattering elements 110, 120 do not interfere with each other, and thus they can either be used for 2 separate channels (Tx and Rx simultaneously) or be united in one wideband channel. With this approach, the design of the mobile phone antenna device 100 can be simplified by moving the complexity from the antenna to the decoupling structure as the parasitic scattering element, and further decrease the complexity, the ohmic losses and the cost of the front end (FE). The parasitic scattering elements 110, 120 can be easily utilized in other symmetrical or asymmetrical wideband MIMO antenna arrays for an improvement of the TE and ECC and therefore maximize the MIMO performance, as well as provide robustness with respect to user interaction with a UE as the device 100.

Figure 2:
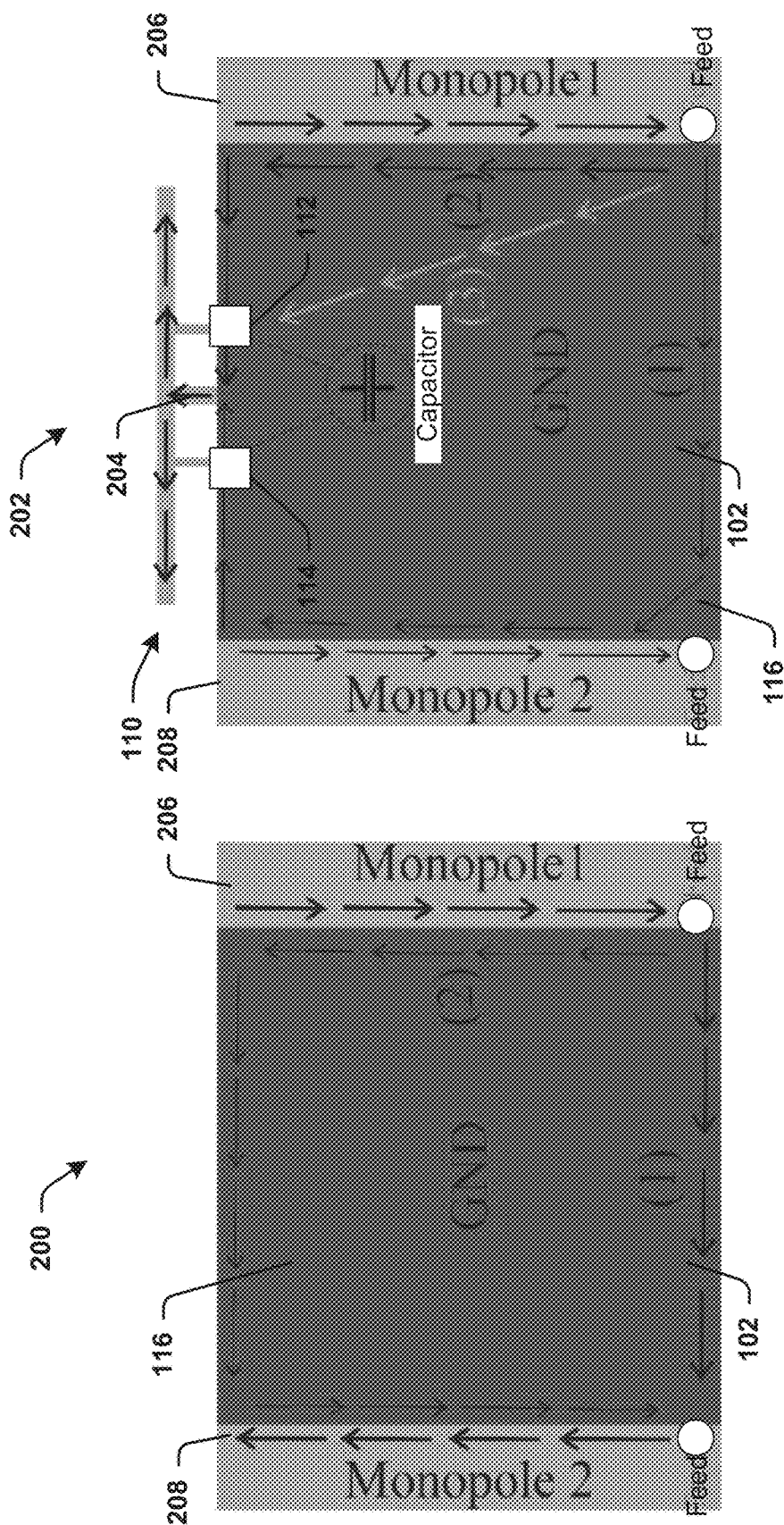
FIG. 2 is another block diagram illustrating a system for an antenna device according to various aspects described.

Referring to FIG. 2, illustrated is another example of a wireless LTE communication system with an antenna system or device for wireless or antenna solutions to enable antenna resonating elements 206, 208 to operate at frequency ranges. The devices 200 and 202 illustrate embodiments of the monopoles and radiation currents (patterns) with directions being generated by the antenna resonating elements 206 and 208 when in connection or integrated with the antenna ports 106 and 108, respectively.

In an aspect, the parasitic scattering element, which can further include two parasitic scattering elements as illustrated with device 100 in FIG. 1 can be located between two simple wideband MIMO antennas as antenna resonating elements 206 and 208 to achieve high level of isolation at two frequencies for a FDD LTE system or wireless network. The operating principle is that an extra coupling path (3) can be created with the parasitic scattering element 110 with one path can be the path (1) between the monopoles and the other path (2) can be through the PS.

In an embodiment, in the case without parasitic scattering element 110, in device 200, when monopole 1 is excited and monopole 2 is loaded with a load (e.g., about 50 Ω), a strong coupling current between them is generated that is approximately one-hundred and eighty (180) degrees out of phase. Whereas, the parasitic scattering element 110 actively operating between the two monopoles creates an additional current path (3) with 180 degrees phase shift with monopole 1 and results in no overall shift at monopole 2.

The parasitic scattering element 110 can provide a mechanism that controls the mutual coupling, the impedance, the radiation mechanism/pattern of the antennas 206 and 208, and thus simplifying the antenna design because less attention is required for designing the particular antenna elements 206, 208. An additional advantage, is that the parasitic scattering element 110 can be simple, relatively inexpensive to manufacture, an increase the total efficiency, a decrease in the correlation between the antenna elements 206 and 208, and supports MIMO for uplink and downlink simultaneously. Moreover, then parasitic scattering elements 110 or 120 can be used to decouple antennas 206 and 208 in a spatial duplex filter configuration.

The differences between the devices 200 and 202 illustrate a comparison of current distribution between the dual MIMO a) without and b) with a parasitic scattering element (s) (e.g., 110, 120 or both) that can tuned by two distributed MEMS capacitors 114 and 112, for example. Currents or current pathways can run mostly along or on the edges of the circuit board or body 102 with ground plane (GND, or 116) as in the network device 200 due to an excitation of a dipole-like mode or dipole mode being generated with the chassis or metallic cover as the GND, or the ground plane 116. With the placement of parasitic scattering element 110 on the side edge of the board device 202 can generate an asymmetric excitation of the current or current path (3) on the board and thus result in the board of the body 116 or device 202 having stronger coupling currents on one side than the other.

In addition, with this position the PS can be integrated in the casing easily or be folded over the ground plane 116 as the Q of the parasitic scattering element can be reasonably high. Further, the capacitors 114 and 116 can be utilized to tune the electrical length of the parasitic scattering element or equivalently coupling current path (3), and thus reduce the volume. In the case with the parasitic scattering element 110, a reduction of the current can occur on monopole 2 due to monopole 1, which induces a reverse current to the short of the parasitic scattering element 110, for example.

Additionally, the parasitic scattering element 110 can generate a diagonal current path (3) as created by the superposition of the current (1) and a reduction in the direct coupling current (2) between monopole 1 and monopole 2. Therefore, the current in monopole 1 and monopole 2 can be generated as in-phase compared to the device 200 without the parasitic scattering element. Moreover, the parasitic scattering element 110 facilitates or enables the orthogonality of the antennas radiation modes across frequencies and thus lowers the ECC.

In another aspect, the parasitic scattering element 110 with the device 200 comprises a unique placement on the side of the printed circuit board or body 102, which allows a tunability at the presence of the user interaction or an external object (e.g., a hand threat) for the antennas 206 or 208.

In addition, the capacitors 112 and 114 can be distributed on each side of a feed 204 via the parasitic scattering element 110 and further allow two types of tunability: simultaneous or independent depending on the communication conditions (e.g., uplink, downlink, or corresponding operating bands). In the case it is desired one of the antennas 206 or 208 to be enhanced more than the other, then an independent capacitor tuning at capacitors 112 or 114 could be generated. Furthermore, with this placement of the parasitic scattering element 110, a longer path I introduced from the antennas to the parasitic scattering element 110 which results in bigger volume or equivalently more efficient antennas while operating to decouple at two communication bands uplink and downlink for full duplex FDD system.

Figure 3:
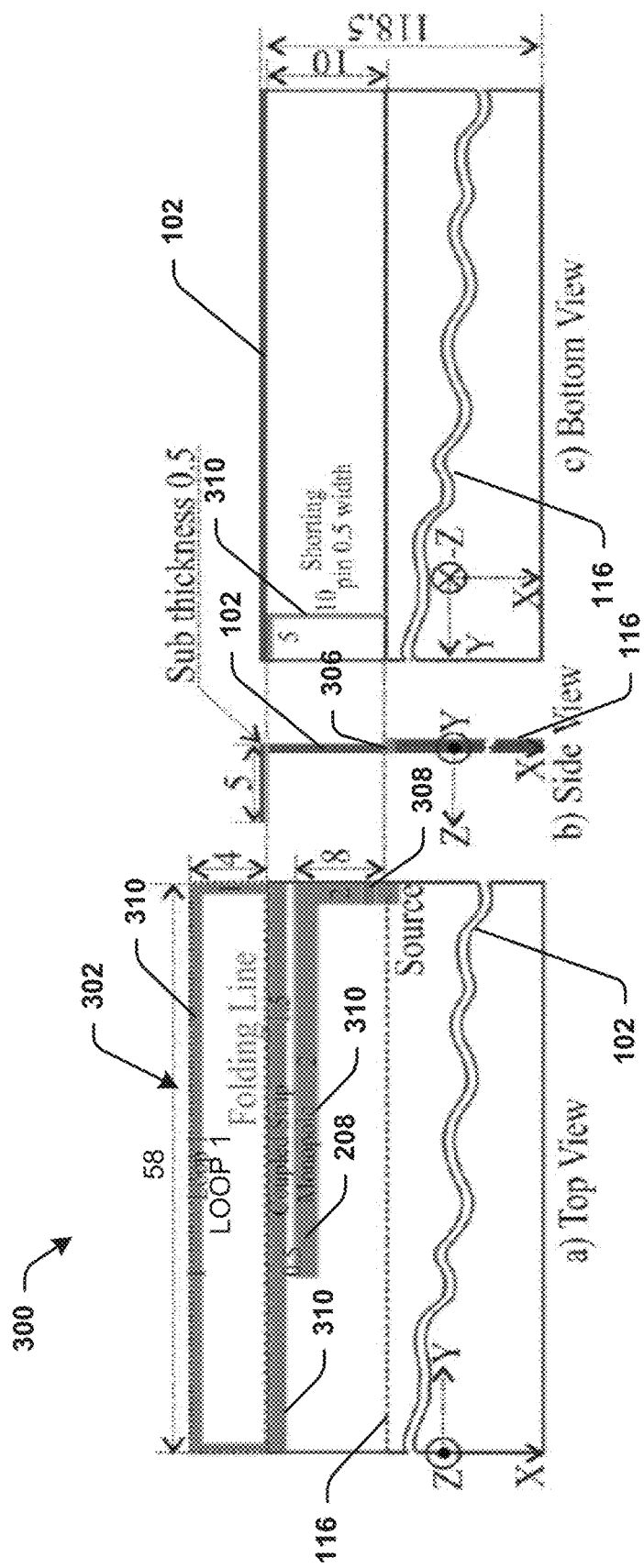
FIG. 3 is another block diagram of a geometry of a monopole coupling of an antenna device according to various aspects described.

Referring to FIG. 3, illustrated is another example monopole coupled loop as illustrated in FIG. 2 with a) top, b) side and c) bottom view. The substrate 102 is illustrated with the ground plane 116, with tracks 310 (e.g., circuit tracks) forming the monopole antenna 208 and current paths, in which the monopole antenna 2 (e.g., 208) can form a monopole coupled loop 302 (e.g., loop 1) with a coupled strip thereat. An inductor component 308 couples the feed source and a capacitor 306 of a parasitic scattering element (e.g., 110). The antenna is mounted on the substrate 102 (e.g., a FR4 substrate, silicon or other substrate) with an εr=4.3, a loss tangent of about 0.025 and volume of about 118×58×1 mm³. Arlon ISO 933 can be used for a casing with an εr=2.33 and total volume of about 121×60×7 mm³. Both can be with thickness of 1 mm. In addition, for robustness of the coupled loop, a FR-4 substrate can be used with thickness of about 0.5 mm.

Figure 4:
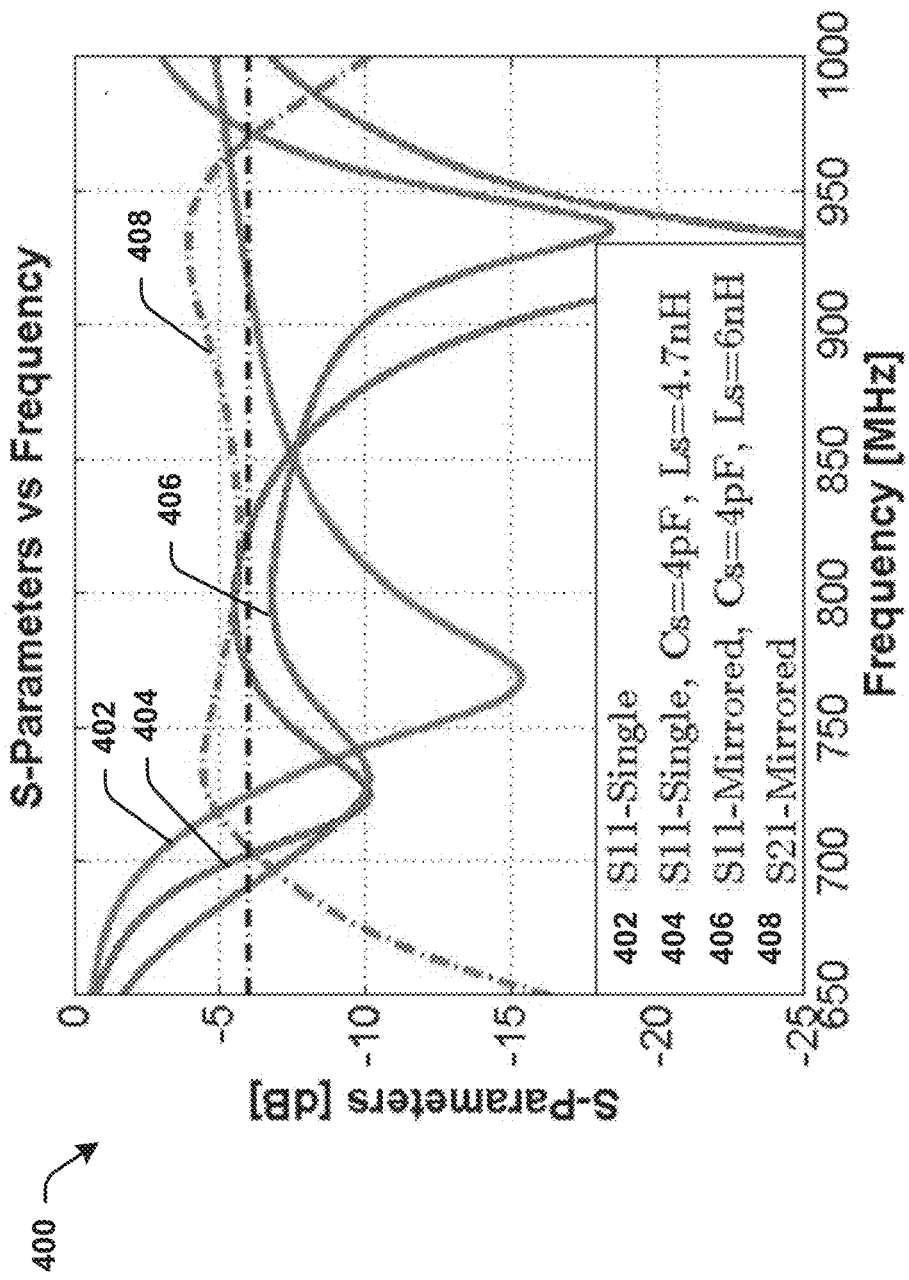
FIG. 4 is a chart comparison of S-parameters between the monopole coupling loop and various elements according to various modes of an antenna device according to various aspects described.

Referring to FIG. 4, illustrated is a set of charted S-parameters of the monopole coupled loop with respect to frequency (MHz). The charted comparison 400 illustrates the S-parameters between the monopole coupled loop (Single), single with a series Inductor (Ls) (e.g., 308) and a shunt capacitor (Cs) (e.g., 306) and Mirrored elements with Ls and Cs. Each scenario is charted within a casing.

Where the monopole (Mon) plus the coupled loop (CL) resonate at about the 768 MHz with a bandwidth of 191 MHz at a threshold level of −6 dB. The CL can be grounded through a shorting pin to the ground plane 116 and is excited capacitively through the monopole of the antenna resonating element (e.g., 208). Throughout this disclosure, the Mon and CL can be referred to as a single element (e.g., curve 402). Moreover, a simple matching network (e.g., curve 404) can comprise a series inductor 308 (Ls=4.7 nH) and a shunt capacitor 306 (Cs=4 pF) that are implemented at the feeding point (FEED of FIG. 3 and elsewhere) of the Mon. In order to obtain an acceptable reflection a coefficient a threshold of −6 dB can be chosen as a design requirement. As a result, the Single element plus Ls and Cs has been covered successfully the bands LTE700/GSM850/900 for lower mobile standards. In order to support MIMO, a second mirrored identical element is located at the adjacent corner of the Printed Circuit Board (PCB) (e.g., curve 406). The curve 408 can represent the S-parameters of mirrored elements. Further, due to small relative distance between elements and the excitation of the same mode of the ground plane results in strongly coupled elements with each other.

Figure 5:
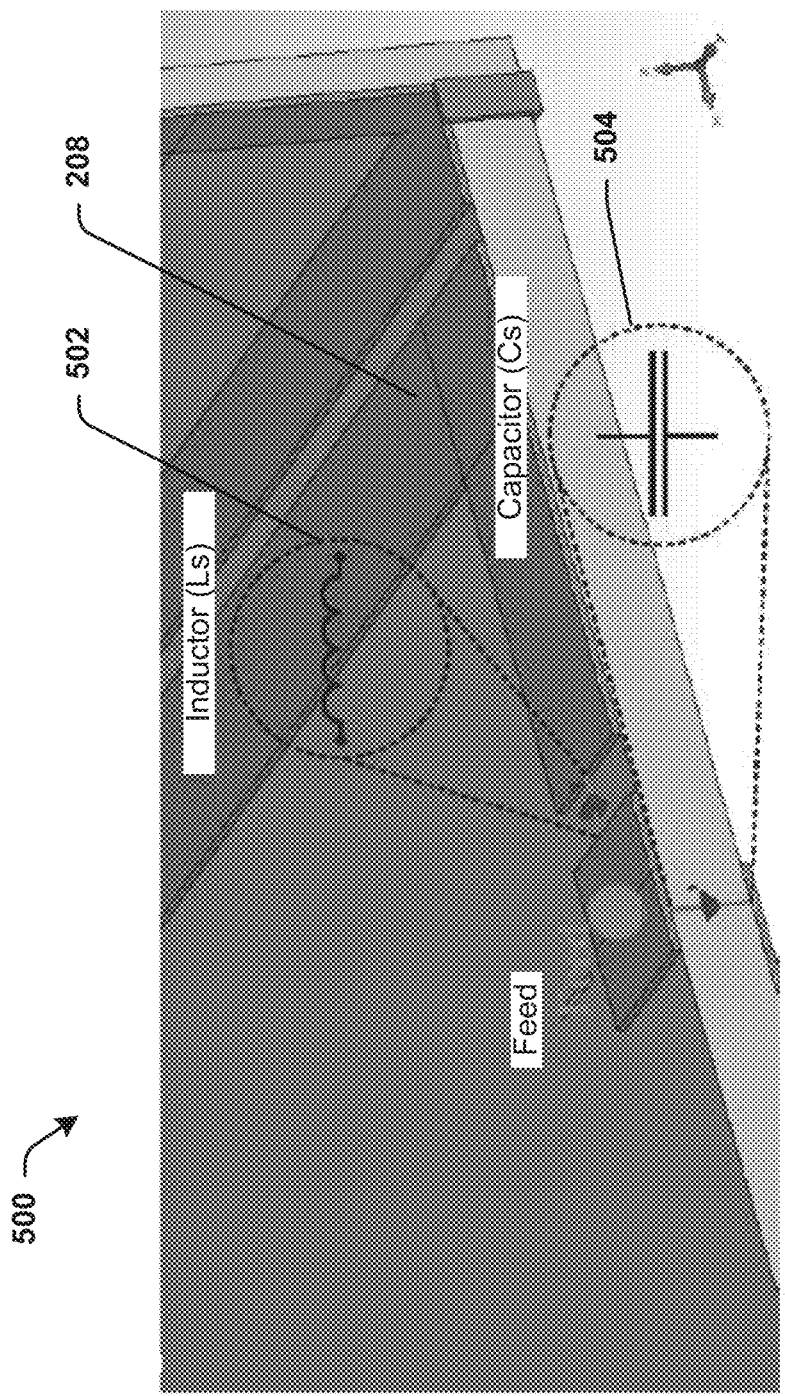
FIG. 5 is another block diagram of a perspective view of a matching network of an antenna device according to various aspects described.

Referring to FIG. 5, illustrated a simple matching network 500 comprising a series inductor 502 (Ls at about 4.7 nH) and a shunt capacitor 504 (Cs at about 4 pF) implemented at the feeding point (Feed) of the monopole antenna 208, for example. As such, a perspective view 500 is displayed of the schematic of the monopole antenna 208 comprising the series Ls and the shunt Cs implemented at the feed of the antenna.

Figure 6:
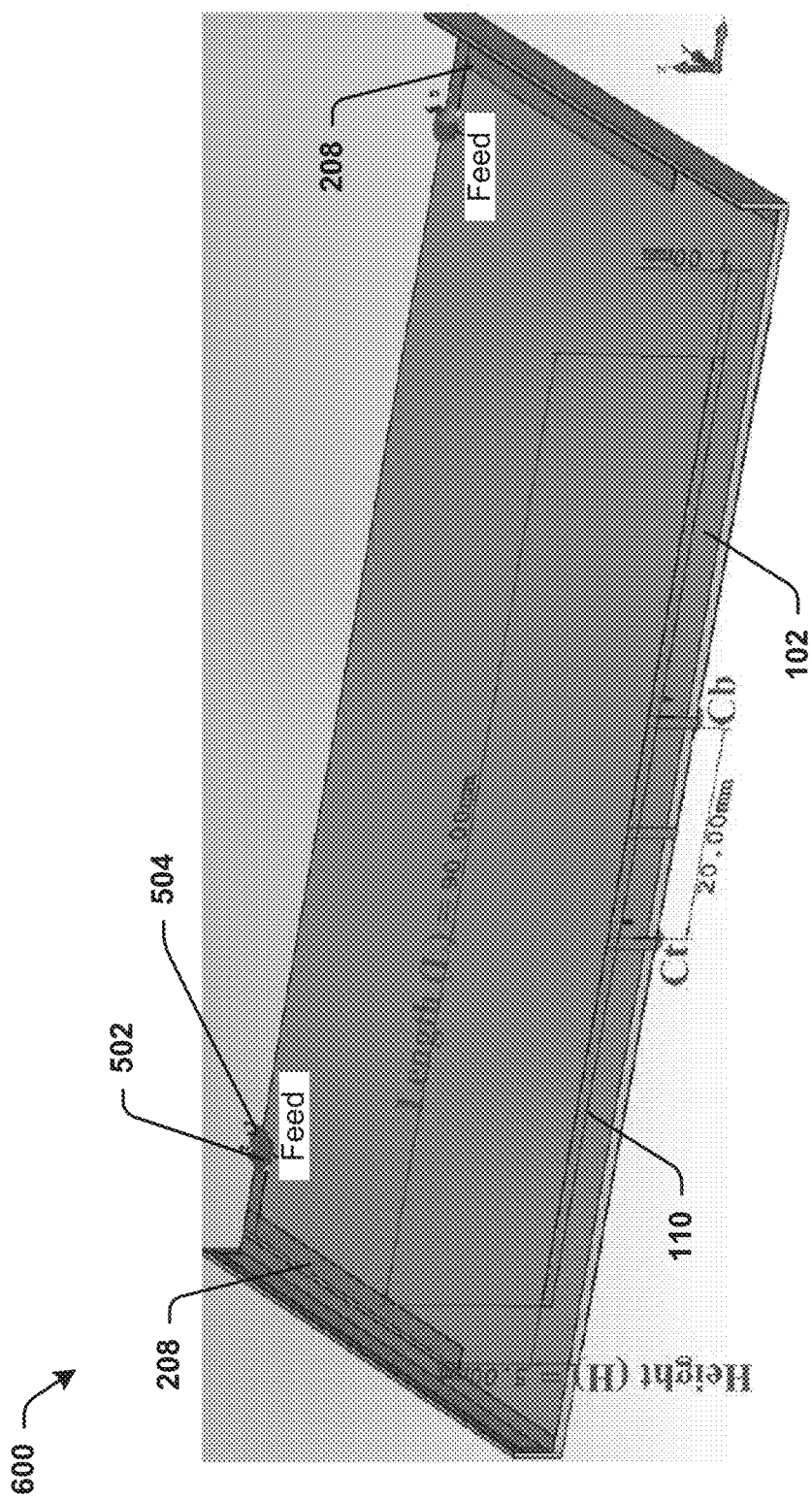
FIG. 6 another block diagram of a perspective view of a parasitic scattering element of an antenna device according to various aspects described.
Figure 7:
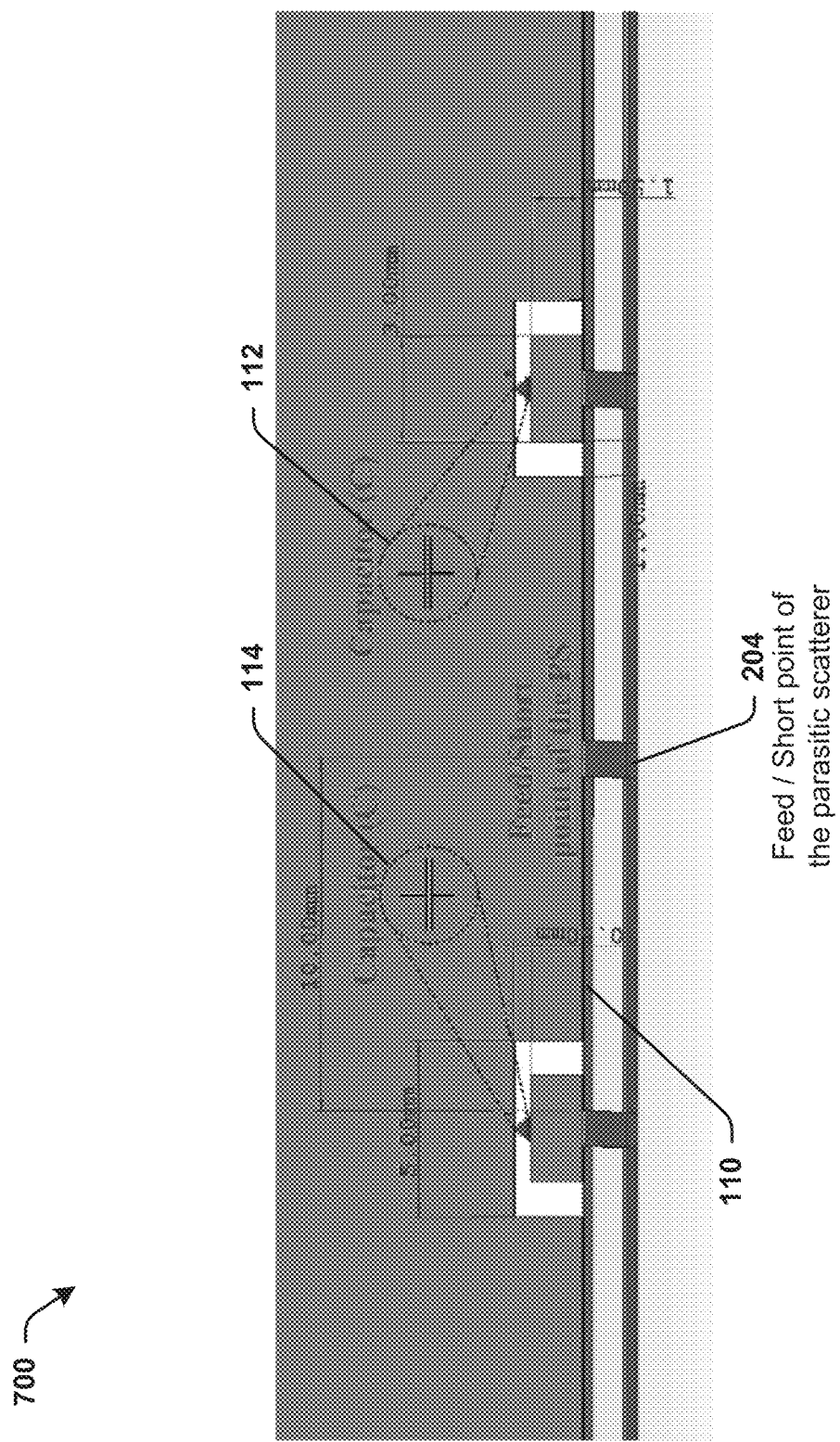
FIG. 7 another block diagram of a perspective view of distributed capacitors of an antenna device according to various aspects described.

The geometry of the proposed parasitic scatterer 110, which is positioned to the left side in the middle of the PCB 102 is shown in FIG. 6 perspective 600 and a bottom view 700 with two distributed parallel MEMS capacitors (C=Ct=Cb) as shown in FIG. 7. Note that the equivalent series resistance (ESR) can have a value of 0.5 Ω for the inductance and a value of 0.25 Ω for the capacitance, for example.

Figure 8:
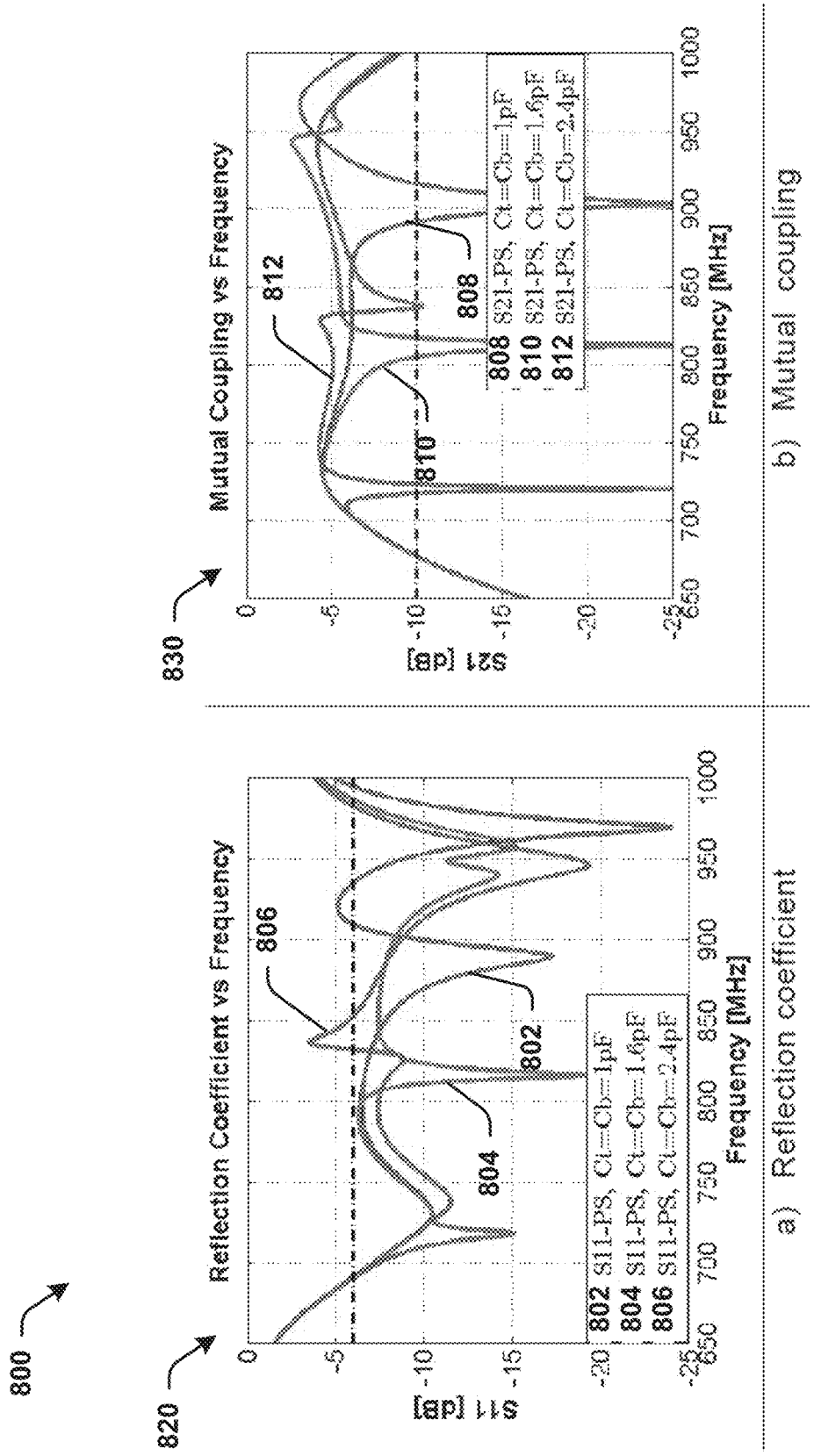
FIG. 8 is a chart comparison of S-parameters between the mirrored elements and a parasitic scattering element tuned to top and bottom capacitors according to various aspects described.

Referring to FIG. 8, illustrated is a set of charts 800 for comparison of the S-parameters of the mirrored elements and the parasitic scattering element (s) (e.g., 110 or 120) with tuned top (Ct) and bottom (Cb) capacitors. A comparison of the S-parameters of the mirrored elements and the parasitic scattering element (s) (e.g., 110 or 120) while the device tunes the two capacitors to three different frequencies as curves 802-806 is displayed in chart 820, while chart 830 displayed the mutual coupling where the decoupling. In particular, when the parasitic scattering element 110 is tuned to a resonant frequency along the curves 802-806 this changes both the input impedance and the mutual coupling of the antenna elements 206 and 208. Additionally, chart 830 displays the mutual coupling where the decoupling bandwidth becomes more narrower when the parasitic scattering element 110 is tuned to a lower frequency due to the higher Q-factor.

Figure 9:
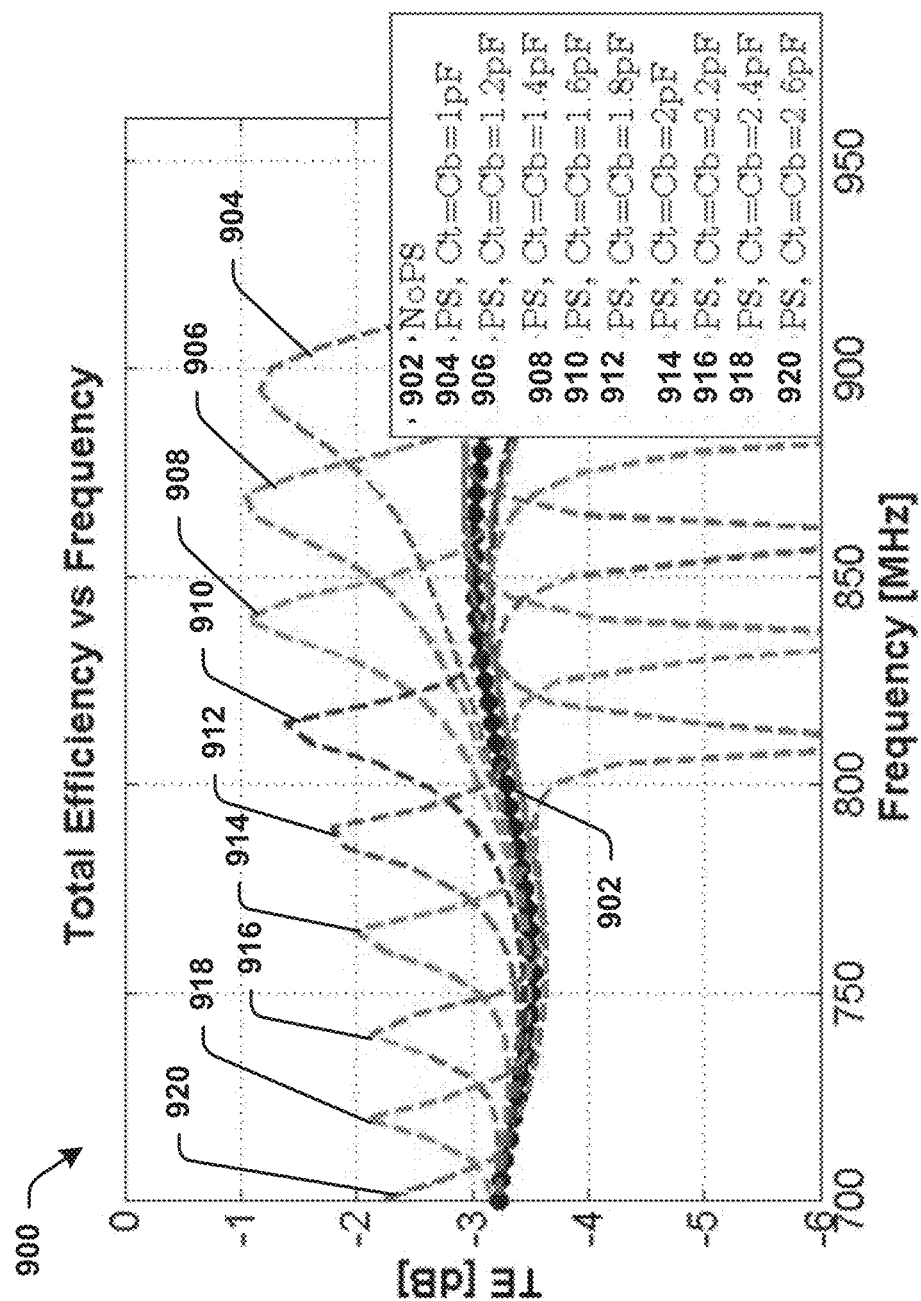
FIG. 9 is a chart comparison of total efficiency (TE) of mirrored elements with no parasitic scattering element and with a parasitic scattering element tuned in accord with various modes of an antenna device according to various aspects described.

Referring to FIG. 9, illustrated is a comparison of the Total Efficiency (TE) of the mirrored elements with no parasitic scatterer or no parasitic scattering element (NoPS) and with the parasitic scattering element tuned by Ct and Cb, respectively. Moreover, in distributing the loading capacitance, the equivalent series resistance (ESR) losses are minimized. By increasing the values of Ct and Cb, the parasitic scattering element can be tuned to lower frequencies and increases the TE of a MIMO antenna as the device 100 or 200 of FIGS. 1 and 2 due to the change in the input impedance, mutual coupling and the current distribution on the ground plane 116 at the tuned frequency. Indeed, the antenna TE degrades as the parasitic scattering element(s) (e.g., 110 or 120) can be tuned further away from its original resonance frequency. This can result because higher fields concentrate around the feed and the pads of the parasitic scattering element, inducing larger currents to the capacitors (e.g., 112, 114). Therefore, larger currents to the ESR of the capacitors cause higher loss. Hence, the lowest efficiency is observed at the lowest operating frequency of the tunable parasitic scattering element 112, 114.

In addition, the higher the value of the capacitors 112, 114, the higher Q factor the parasitic scattering element becomes, and thus a narrower operating bandwidth. Furthermore, the dynamic range of the capacitors for the entire tuning spectrum is from 0.7 to 2.6 pF, which can be practically implemented with a tuner component. The sensitivity and the tuning range of Ct and Cb can be adjusted by the position of the pads for the capacitors 112, 114 on the ground plane from the feed point of the PS. The closer they are to the feed of PS the less sensitive and the wider range of capacitance is introduced.

As such, the comparison 900 between the ECC of the mirrored elements with curves for NoPS 902 and with parasitic scattering elements tuned by Ct and Cb at curves 904-920 are illustrated in illustrated. It is observed that the ECC has reduced significantly but the BW of the ECC becomes narrower when PS is tuned to a lower frequency due to the higher Q-factor. Understanding why the ECC has been reduced significantly can be explained by a comparison between the radiation patterns of the mirrored elements with NoPS and with parasitic scattering elements being tuned by the capacitors 112, 114. It can be observed how the patterns are changed with the parasitic scattering element 112, which can leads to an orthogonal radiation pattern compared to those without PS. As such, the parasitic scattering elements 112 or 114 can alter the radiation pattern from a vertical to a diagonal or other orientated radiation pattern in order to eliminate the antenna monopole correlation and mutual coupling during FDD LTE communications.

Figure 10:
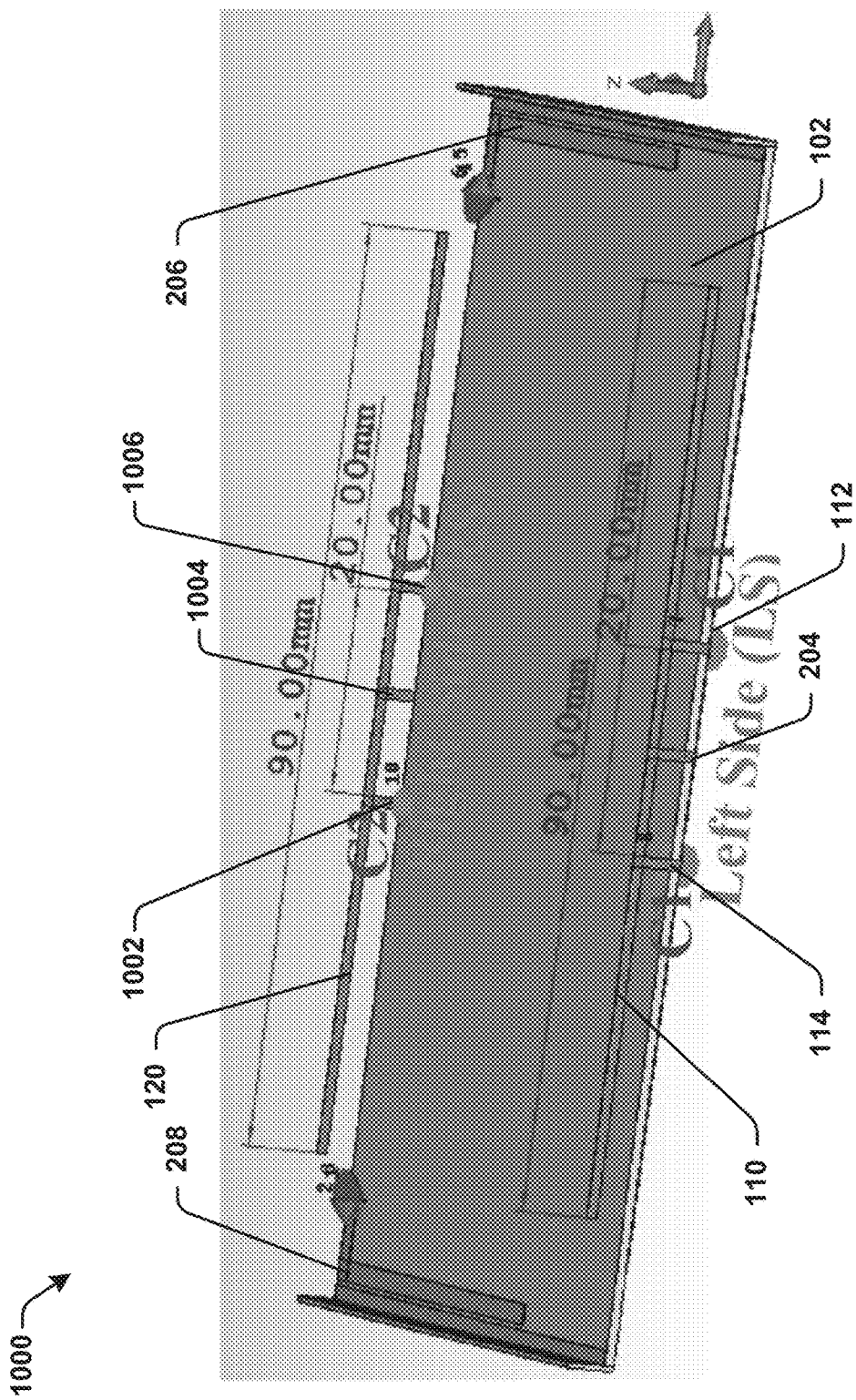
FIG. 10 is another block diagram of a geometry of parasitic scattering elements of an antenna device according to various aspects described.

Referring to FIG. 10, illustrated is an example geometry of the proposed two substantially similar parasitic scattering elements 110, 120 to the left (LS) and ride side (RS) position of the PCB between the antennas with a top perspective view. Due to the narrow bandwidth of a single parasitic scattering element either the uplink or the downlink channel can be supported at a time, and both with parasitic scattering elements 110 and 120. Whereas, the FDD LTE frequency bands can be paired to allow simultaneous downlink Rx and uplink Tx transmission on two frequencies with a UE device 100 or 200, for example. The bands can also have a sufficient separation to enable the transmitted signals to not to interfere with the receiver performance. For LTE band 20, for example, the FDD downlink can start at 791-821 MHz and FDD uplink starts at 832-862 MHz with a duplex gap of 11 MHz and a duplex spacing of 41 MHz based on network BW of 5 MHz valid for Europe Middle East and Africa (EMEA), for example. As such, the antenna device or UE 1000 can comprise two tunable parasitic scattering elements 110 and 120, each with respective dual, tunable capacitors (1002, 1004 and 112, 114) to mitigate the coupling at two separate frequency.

Figure 11:
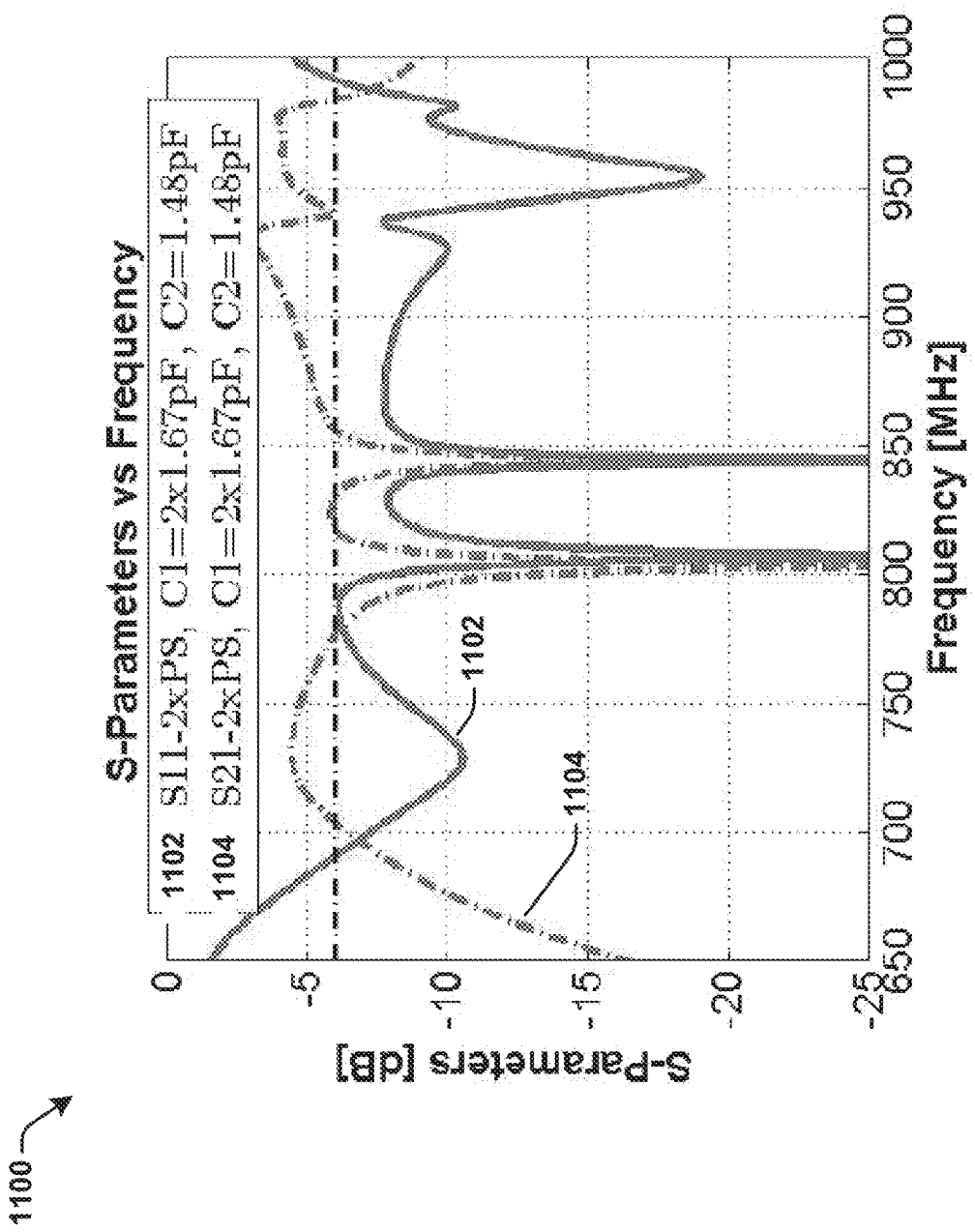
FIG. 11 is chart comparison of S-parameters with two parasitic scattering elements according to various aspects described.

Referring to FIG. 11, illustrated is a comparison 1100 of the S-parameters with two parasitic scattering elements tuned by C1 for the left and C2 for the right parasitic scattering elements, respectively along curves 1102-1104. The two parasitic scattering elements 110, 120 can effectively match and decouple correlation among antennas 208, 206 at two separate resonance frequencies with a duplex spacing of about 41 MHz without interfering with each other in order to support FDD LTE for Rx and Tx simultaneously. The matching and the mitigation of the S-parameter for the two parasitic scattering elements can be different due to the different lengths from the antennas to each parasitic scattering element.

Figure 12:
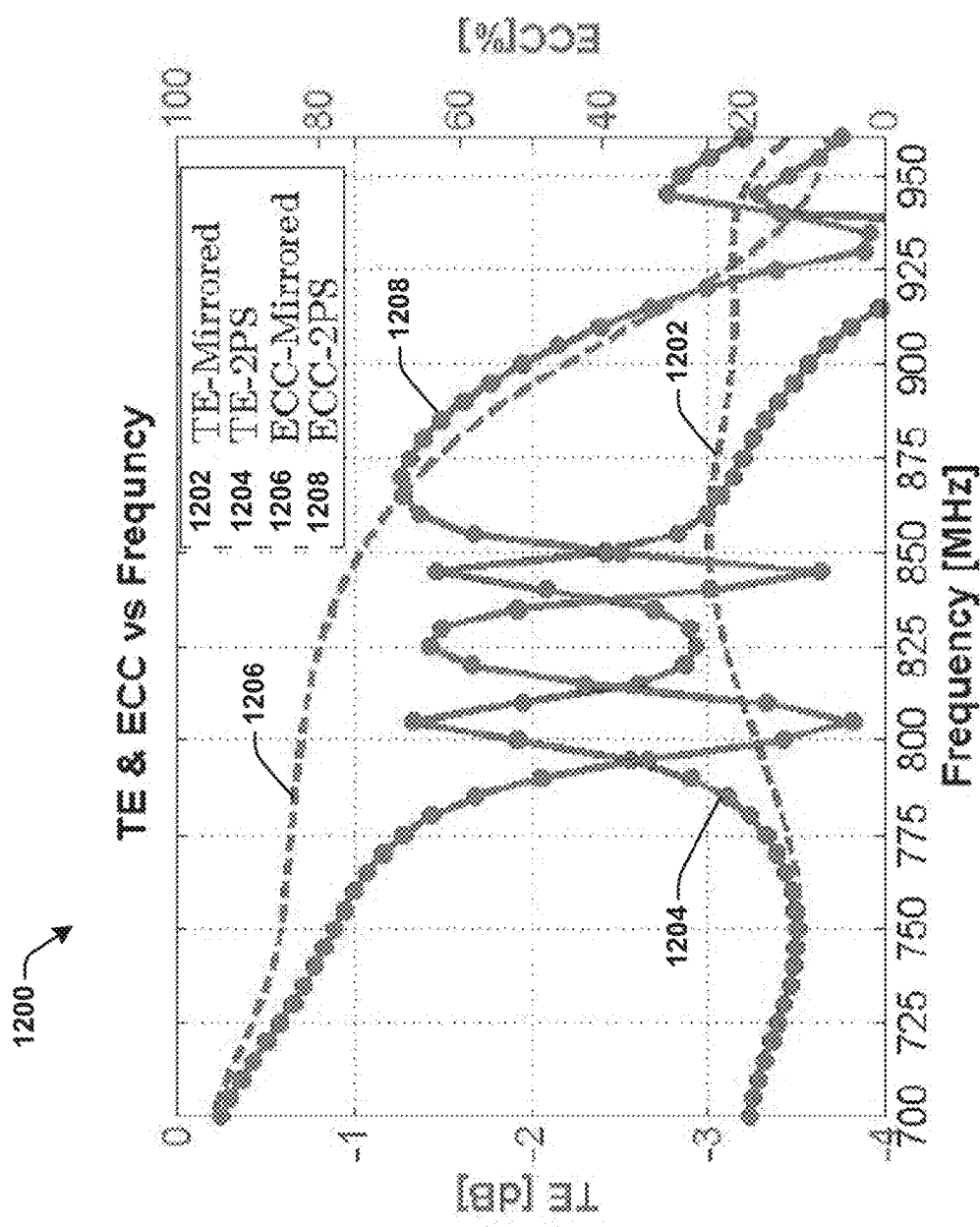
FIG. 12 is chart comparison of TE and envelope correlation coefficient (ECE) and two parasitic scattering elements tuned in accord with various modes of an antenna device according to various aspects described.

Referring to FIG. 12, illustrated is a comparison 1200 of the TE and ECC between the mirrored elements and the two parasitic scattering elements tuned by Cl for left and C2 right PS, respectively along curves 1202-1208. It is observed that at 804 and 845 MHz the peak TE has been increased with 1.9 and 1.73 dB and the peak ECC has been reduced by 77.4 and 66.6%. As a result, the design requirements with ECC less than 0.5 and TE greater than −3 dB for good MIMO performance can be achieved. In addition, by tuning the tunable MEMS, the MIMO antenna can operate at different frequencies with a similar performance.

Figure 13:
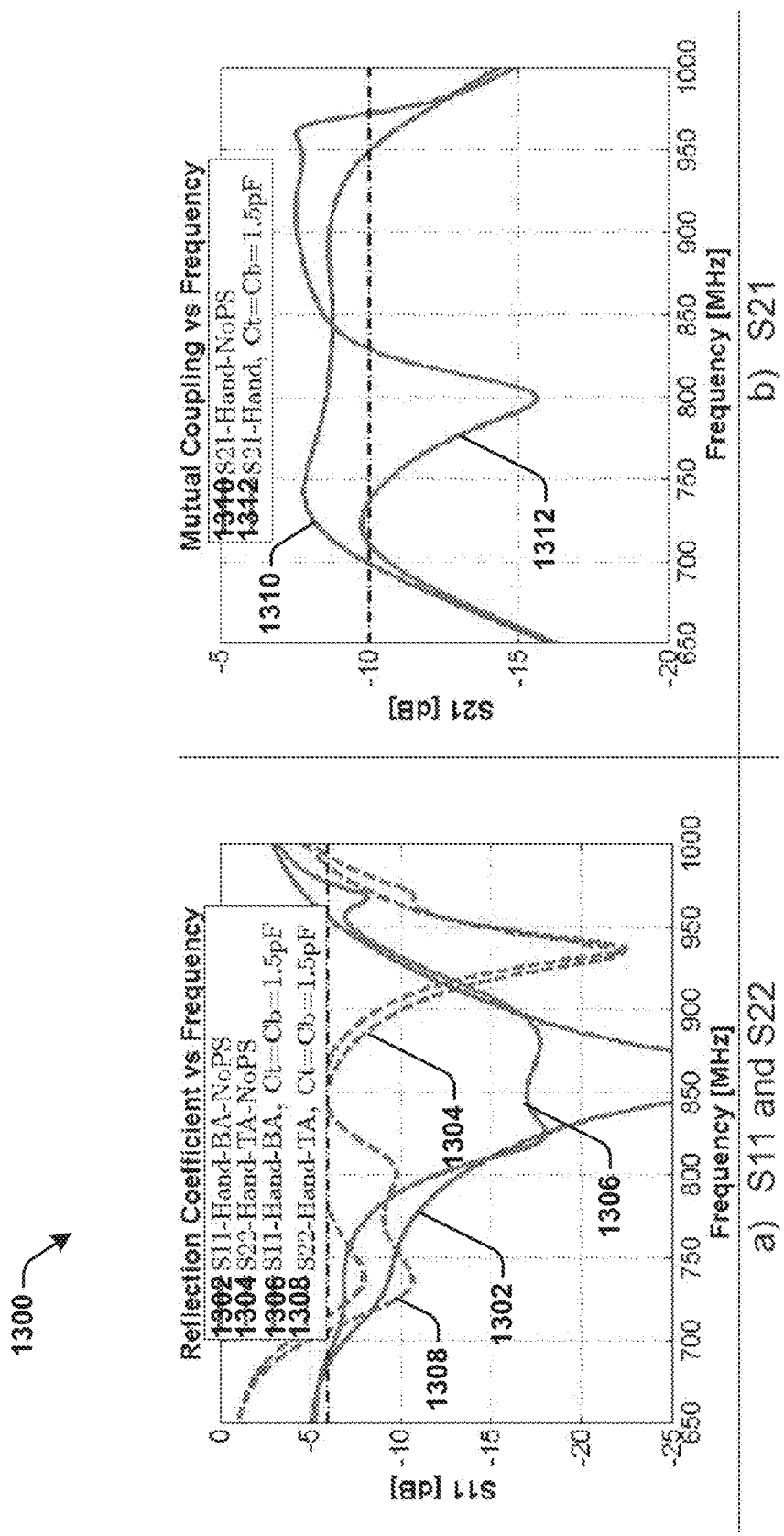
FIG. 13 is a chart comparison of S-parameters with a user's hand and mirrored elements without and with a parasitic scattering element according to various aspects described.

Referring to FIG. 13, illustrated is a comparison between the S-parameters of a user's hand/external object and mirrored elements without and with a parasitic scattering element tuned by Ct and Cb as curves 1302-1312. As a result of the higher permittivity of the user's hand or external object, for example, mismatches in the antennas impedance and a reduction of the mutual coupling are observed. In the case without a parasitic scattering element, the bottom antenna (BA) is more changed than the top antenna (TA) due to the hand palm absorbs more energy than the index finger. Whereas, by tuning the parasitic scattering element with Ct=Cb=1.5 pF, a better matching of impedance of the TA and the BA can be obtained. Moreover, it is observed a wide BW decoupling with an improvement in a reduction of 7 dB.

Figure 14:
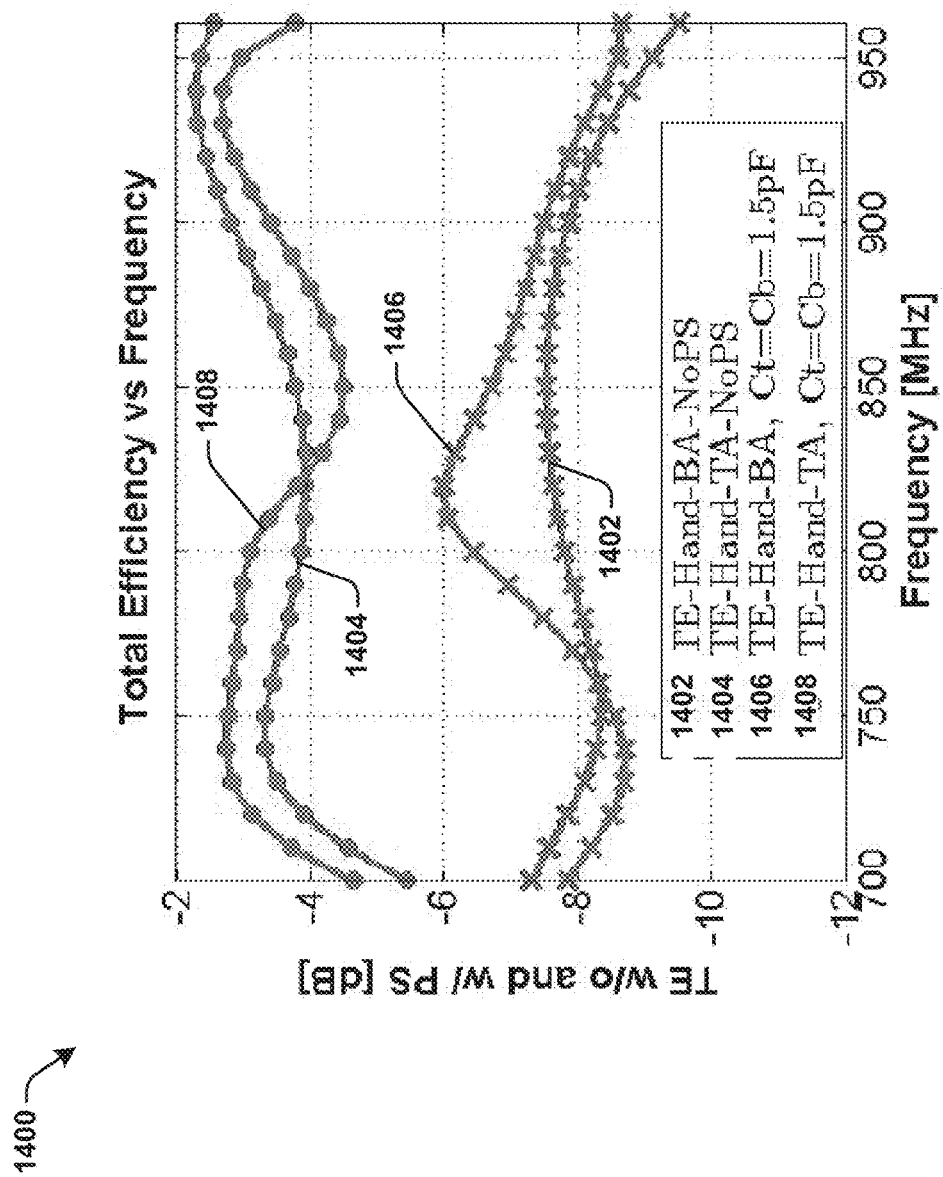
FIG. 14 is a chart comparison of total efficiency (TE) of the user's hand and mirrored elements with and without a parasitic scattering element tune in accord with various modes of an antenna device according to various aspects described.

Referring to FIG. 14, illustrated is another comparison between the Total Efficiency (TE) of a user's hand on a mobile device utilizing the antenna systems or devices herein and the mirrored elements without and with the parasitic scattering element(s) 110 or 120 tuned by Ct and Cb, respectively along curves 1202-1408. In this scenario, the user hand has significant impact on the TE compared to the free space. In the case without a parasitic scattering element, a difference can be seen in the TE between the TA and the BA. In order to maximize the performance of MIMO technology it is important that the power branch ration is equivalent between the two antennas. In fact, it is obtained an improvement of the TE at the TA and BA of 1 dB and 2 dB by tuning the parasitic scattering element (e.g., 110) with Ct=Cb=1.5 pF at 800 MHz.

Figure 15:
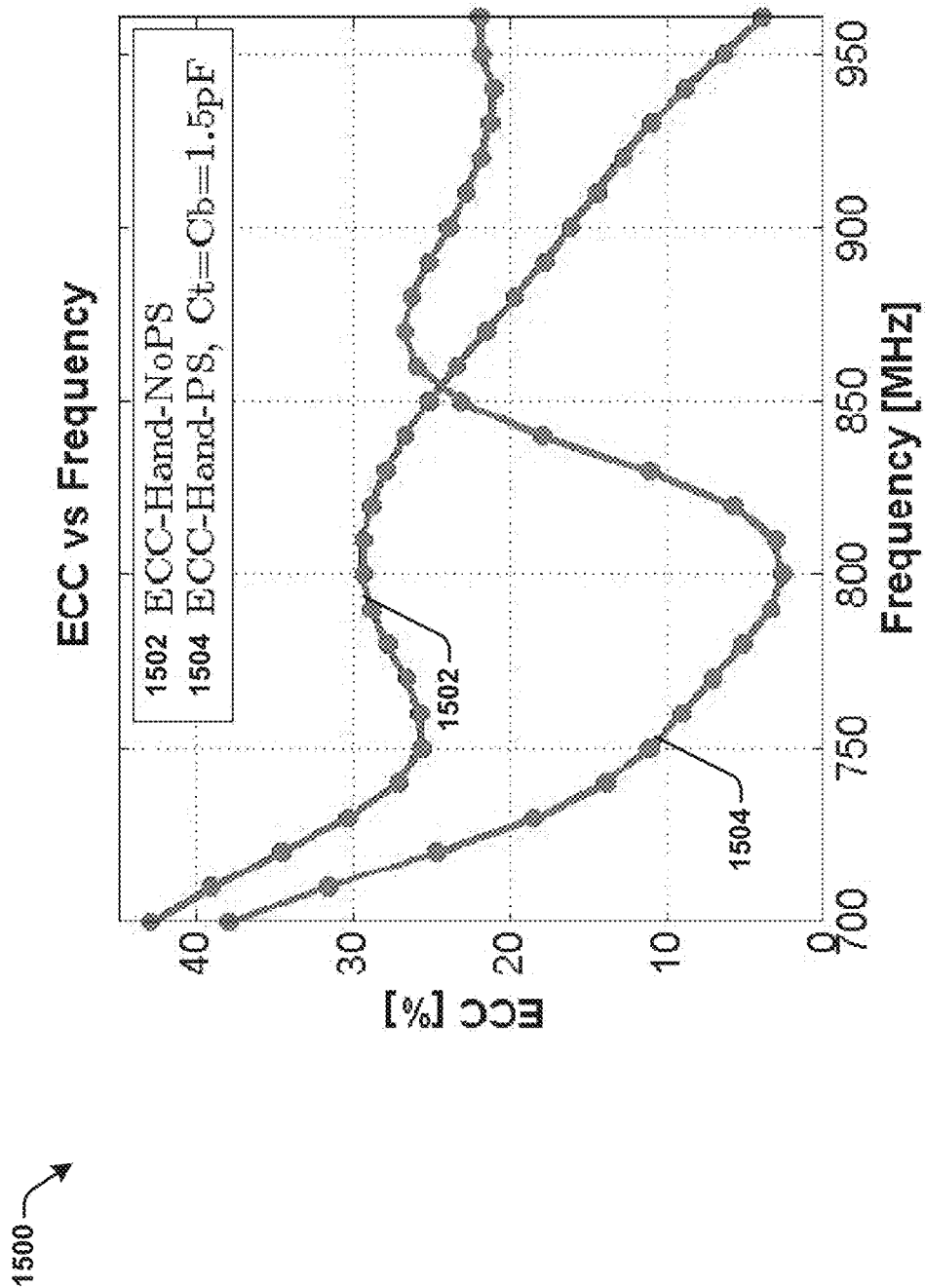
FIG. 15 is chart comparison of ECE and the user's hand and mirrored elements with and without the parasitic scattering element tuned in accord with various modes of an antenna device according to various aspects described.

Referring to FIG. 15, illustrated is another comparison between the ECC of the user's hand and the mirrored elements without and with the PS tuned by tuned Ct and Cb, respectively. The curves 1502 and 1504 illustrated that the user's hand can have a positive effect to the ECC due to the absorption effect, which increases the isolation effect between the antennas, which is at an acceptable level for utilization of MIMO. In addition, the parasitic scattering element (e.g., 110) till changes the radiation patterns and therefore reduces correlation to a lower value.

Figure 16:
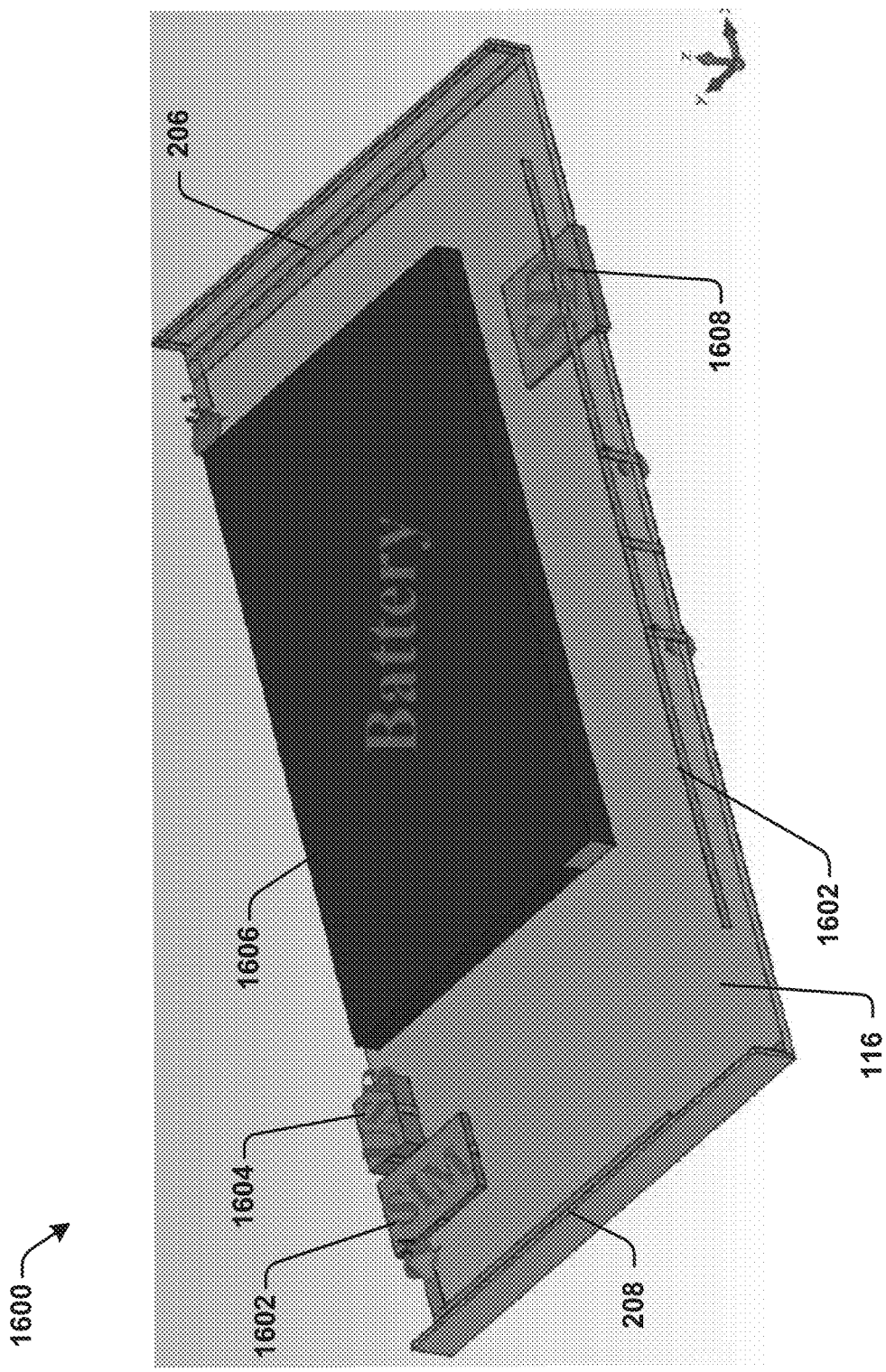
FIG. 16 is another block diagram of a perspective view of a parasitic scattering element with an antenna device and connectors according to various aspects described.

Referring to FIG. 16, illustrated is another example of the antenna elements herein (e.g., as MIMO antennas) with a parasitic scattering element 110 and connectors such as a battery 1606, SIM 1602, USB 1604, and SD connector 1608 that even breaking the symmetry of the dual antennas with integrating components does not degraded the performance of the PS. Here, the MIMO antennas 208 and 206 with parasitic scattering element 110 and the connectors such as: a battery (e.g., a nickel based battery) 1606, SIM 1602, USB 1604 and SD connector 1608 made of steel can also be grounded to the system ground plane 116. These elements or connects can be ground only with the strips representing grounding pins, for example. A comparison between the S-parameters of the dual elements with parasitic scattering element 110 can be tuned by Ct and Cb and integrated connectors, in which observed that even with asymmetric topology, the parasitic scattering element 110 can operate efficiently.

Figure 17:
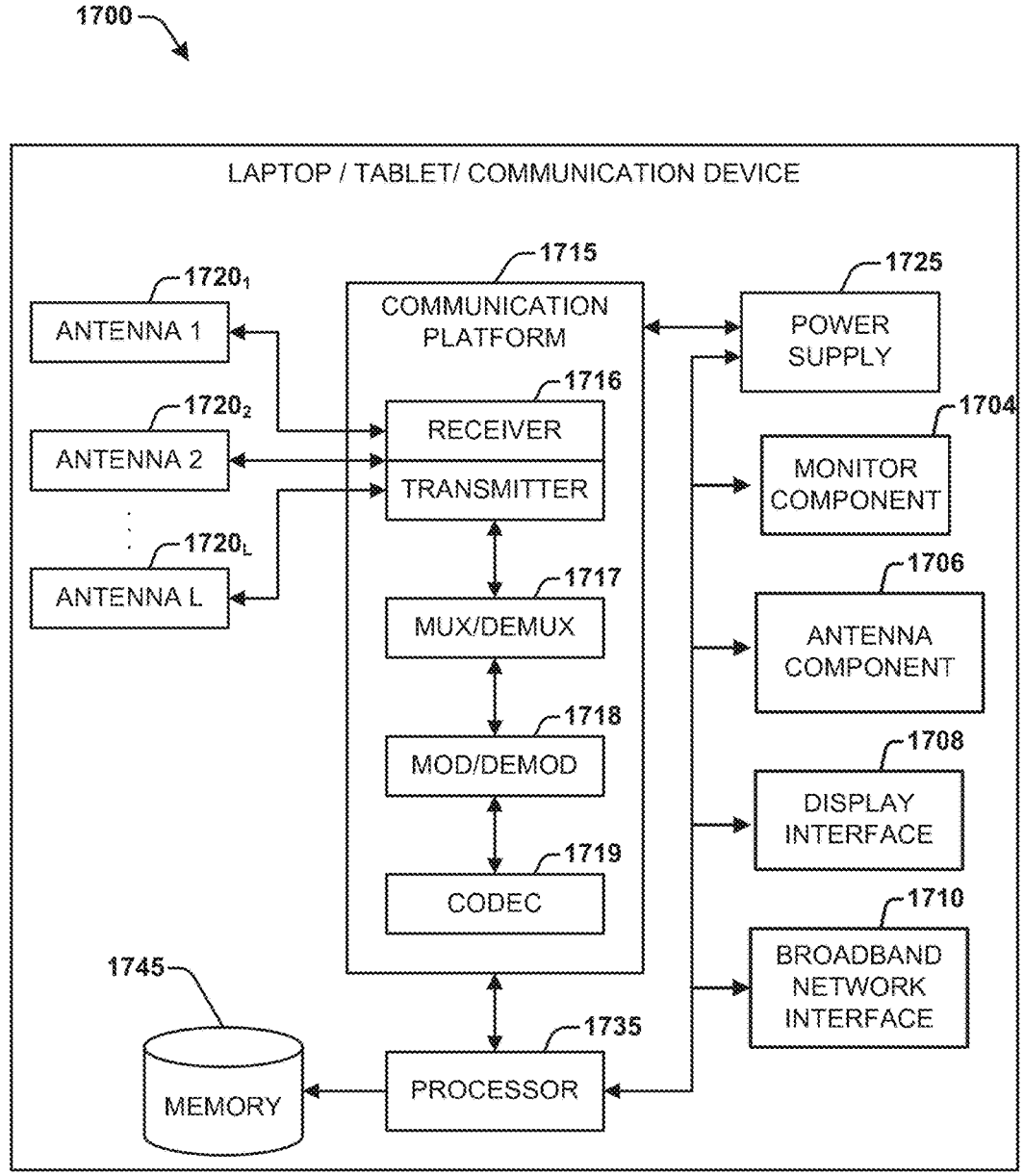
FIG. 17 is an exemplary wireless terminal for utilizing various aspects described.

In order to provide further context for various aspects of the disclosed subject matter, FIG. 17 illustrates a non-limiting example of a computing device, such as a laptop, tablet, or other communication device or wireless terminal 1700 that can implement some or all of the aspects described herein. In an aspect, wireless terminal, such as a laptop, tablet, other communication device, or wireless terminal 1700 can receive and transmit signal(s) to and/or from wireless devices such as APs, access terminals, wireless ports and routers, or the like, through a set of L antennas 1720, which can be configured according to one or more embodiments or aspects described herein. In one example, antennas 1720 can be implemented as part of a communication platform 1715, which in turn can comprise electronic components and associated circuitry and/or other means that provide for processing and manipulation of received signal(s) and signal(s) to be transmitted. The antennas 1720 can comprise the various antenna elements incorporating the different aspects or embodiments disclosed herein, which can transmit, receive or both transmit and receive signals. In one example, the antennas 1720 can be located along an edge or side of the wireless terminal 1700, which can be within a same quadrant, section, portion or subset of the volume of the mobile device, opposing or different sections, for example.

In an aspect, communication platform 1715 can include a monitor component 1704 and antenna component 1706, which can couple to communication platform 1715 and include electronic components with associated circuitry that provide for processing and manipulation of received signal(s) and other signal(s) to be transmitted. The communication platform 1715 can further comprise a receiver/transmitter or transceiver 1716, which can transmit and receive signals and/or perform one or more processing operations on such signals (e.g., conversion from analog to digital upon reception, conversion from digital to analog upon transmission, etc.). In addition, transceiver 1716 can divide a single data stream into multiple, parallel data streams, or perform the reciprocal operation.

Additionally, the communication device 1700 can include display interface 1708, which can display functions that control functionality of the device 1700, or reveal operation conditions thereof. In addition, display interface 1708 can include a screen to convey information to an end user. In an aspect, display interface 1708 can be a liquid crystal display, a plasma panel, a monolithic thin-film based electro chromic display, and so on. Moreover, display interface 1708 can include a component (e.g., speaker) that facilitates communication of aural indicia, which can also be employed in connection with messages that convey operational instructions to an end user. Display interface 1708 can also facilitate data entry (e.g., through a linked keypad or through touch gestures), which can cause access equipment and/or software 1700 to receive external commands (e.g., restart operation).

Broadband network interface 1720 facilitates connection of access equipment and/or software 1700 to a service provider network (not shown) that can include one or more cellular technologies (e.g., third generation partnership project universal mobile telecommunication system, global system for mobile communication, and so on) through backhaul link(s) (not shown), which enable incoming and outgoing data flow. Broadband network interface 1710 can be internal or external to access equipment and/or software 1700, and can utilize display interface 1708 for end-user interaction and status information delivery.

Processor 1735 can be functionally connected to communication platform 1708 and can facilitate operations on data (e.g., symbols, bits, or chips) for multiplexing/demultiplexing, such as effecting direct and inverse fast Fourier transforms, selection of modulation rates, selection of data packet formats, inter-packet times, and so on. Moreover, processor 1735 can be functionally connected, through data, system, or an address bus, to display interface 1708 and broadband network interface 1710, to confer, at least in part, functionality to each of such components.

In another example, a multiplexer/demultiplexer (mux/demux) unit 1717 can be coupled to transceiver 1716. Mux/demux unit 1717 can, for example, facilitate manipulation of signal in time and frequency space. Additionally or alternatively, mux/demux unit 1717 can multiplex information (e.g., data/traffic, control/signaling, etc.) according to various multiplexing schemes such as time division multiplexing (TDM), frequency division multiplexing (FDM), orthogonal frequency division multiplexing (OFDM), code division multiplexing (CDM), space division multiplexing (SDM), or the like. In addition, mux/demux unit 1717 can scramble and spread information according to substantially any code generally known in the art, such as Hadamard-Walsh codes, Baker codes, Kasami codes, polyphase codes, and so on.

In a further example, a modulator/demodulator (mod/demod) unit 1718 implemented within communication platform 1715 can modulate information according to multiple modulation techniques, such as frequency modulation, amplitude modulation (e.g., L-ary quadrature amplitude modulation (L-QAM), etc.), phase-shift keying (PSK), and the like. Further, communication platform 1715 can also include a coder/decoder (codec) module 1719 that facilitates decoding received signal(s) and/or coding signal(s) to convey.

According to another aspect, wireless terminal 1700 can include a processor 1735 configured to confer functionality, at least in part, to substantially any electronic component utilized by wireless terminal 1700. As further shown in system 1700, a power supply 1725 can attach to a power grid and include one or more transformers to achieve a power level at which various components and/or circuitry associated with wireless terminal 1700 can operate. In one example, power supply 1725 can include a rechargeable power mechanism to facilitate continued operation of wireless terminal 1700 in the event that wireless terminal 1700 is disconnected from the power grid, the power grid is not operating, etc. The high band antenna 308 or 506, for example, with the other antenna element configurations disclosed herein can further facilitate communications with a wireless charging of the power supply 1725, such as with a transfer of energy from the antenna system to the power supply 1725 via an oscillating magnetic field, for example.

In a further aspect, processor 1735 can be functionally connected to communication platform 1715 and can facilitate various operations on data (e.g., symbols, bits, chips, etc.), which can include, but are not limited to, effecting direct and inverse fast Fourier transforms, selection of modulation rates, selection of data packet formats, inter-packet times, etc. In another example, processor 1735 can be functionally connected, via a data or system bus (e.g., a wireless PCIE or the like), to any other components or circuitry not shown in system 1700 to at least partially confer functionality to each of such components, such as by the antenna systems disclosed herein.

As additionally illustrated, a memory 1745 can be used by wireless terminal 1700 to store data structures, code instructions and program modules, system or device information, code sequences for scrambling, spreading and pilot transmission, location intelligence storage, determined delay offset(s), over-the-air propagation models, and so on. Processor 1735 can be coupled to the memory 1745 in order to store and retrieve information necessary to operate and/or confer functionality to communication platform 1715 and/or any other components of wireless terminal 1700.

Further, the antenna systems described above with the communication device 1700 can also be configured, for example, to operate at a wide range of frequencies in a high band frequency range additionally include peer-to-peer (e.g., mobile-to-mobile) ad hoc network systems often using unpaired unlicensed spectrums, 802.xx wireless LAN, BLUETOOTH and any other short- or long-range, wireless frequency ranges and communication techniques. The narrow band antenna elements disclosed herein, such as antennas resonating systems of devices disclosed, for example, can also be configured to operate at other frequency ranges also.

In other examples, the antenna elements 206 or 208 can operate to communicate wirelessly with other components, such as the display interface 1708 as a wireless device, or with other wireless interfaces, such as a wireless USB device, for example. For example, a wireless USB device can communicate within a 3.1 to a 10.6 GHz frequency range. In addition, the antenna systems disclosed can be configured to communicate with other wireless connections, components, interfaces or devices in order to provide communication interfacing for wireless component-to-component communications. For example, a PCB to PCB interface can be facilitated by the high band antenna systems as well as micro millimeter wave communications among one or more internal or external components. Other communication interfaces can also be facilitated by the antenna elements disclosed such as an internet of things (IoT) to IoT components, wearable components, mobile to mobile, a network base station (e.g., a macro cell network device, femto cell device, pico cell device or other network devices) or any combination thereof to communicate via one of more of the antenna elements, such as via the antenna system or devices herein, for example. Additional other examples are also envisioned by which the antenna systems disclosed herein can operate in different frequency ranges, as well as communication and facilitate communications with, or among, one or more wireless components or devices. For example, industrial, scientific and medical (ISM) radio bands, radar band widths, or other ranges of a frequency spectrum can also be facilitated for communications by the antenna systems being disclosed.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 18:
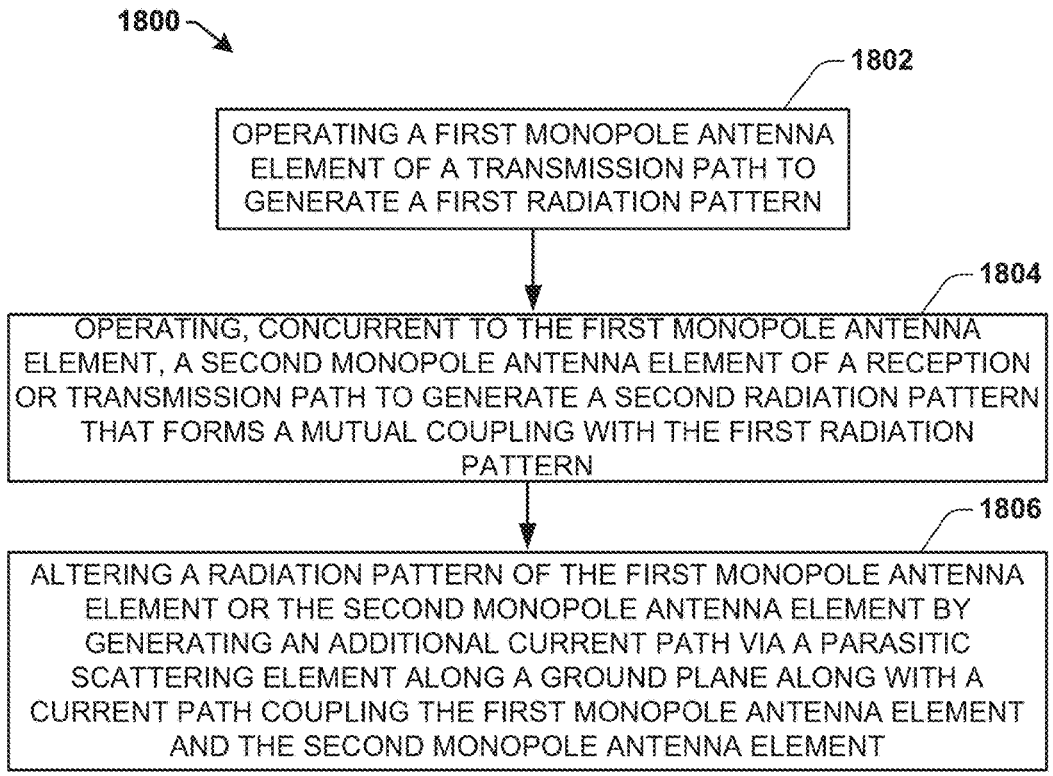
FIG. 18 is a process flow of a method for mobile device with an antenna system disclosed in accordance with various aspects or embodiments herein.

Referring to FIG. 18, illustrated is a method 1800 employed in a mobile device for generating an isolation of similar antennas on different frequencies of a low frequency range with a mutual coupling. At 1802, the method comprises operating a first monopole antenna element of a transmission path to generate a first radiation pattern.

At 1804, the method includes operating, concurrent to the first monopole antenna element, a second monopole antenna element of a reception or transmission path to generate a second radiation pattern that forms a mutual coupling with the first radiation pattern.

At 1806, the method includes altering a radiation pattern of the first monopole antenna element or the second monopole antenna element by generating an additional current path via a parasitic scattering element along a ground plane along with a current path coupling the first monopole antenna element and the second monopole antenna element.

In one embodiment, the method 1800 can further include generating a capacitive element via one or more capacitors (e.g., micro-electro mechanical systems (MEMS) capacitors or other capacitive elements) of the parasitic scattering element to alter the radiation pattern from a vertical radiation pattern or a horizontal radiation pattern to a diagonal radiation pattern. An impedance of the first monopole antenna element and the second monopole antenna element can further be matched via a first parasitic scattering element coupled to the first monopole antenna element and a second parasitic scattering element, which is coupled to the second monopole antenna element. The parasitic scattering element(s) can operate further to suppress the mutual coupling between the first monopole antenna element and the second monopole antenna element via one of the first parasitic scattering element or the second parasitic scattering element. In addition, these capacitive elements or capacitors of the parasitic scattering element can alter the first radiation pattern from a dipole mode with a chassis to a monopole mode based on one or more changes in the mutual coupling, such as from changes in frequency, user or external objects or other surroundings that may affect parameters the coupling, for example.

Examples may include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a system adapted to transmit and receive long term evolution (LTE) wireless communication signals used in a multiple-input multiple-output (MIMO) network device, the system comprising: a chassis comprising a volume comprising a ground plane; a first antenna port configured to be in the volume of the chassis, coupled to the ground plane, and coupled to a first antenna element, wherein the first antenna port is further configured to operate within a first resonant frequency range; a second antenna port configured to be in the volume of the chassis and on the opposite side of the first antenna port, coupled to the ground plane, and coupled to a second antenna element, wherein the second antenna port is further configured to operate within a second resonant frequency range that enable the second antenna element to generate a radiation correlation of a mutual coupling of radiation patterns from the first antenna port and the second antenna port; a first parasitic scattering element coupled to the first antenna port; and a second parasitic scattering element coupled to the second antenna port; wherein the first parasitic scattering element and the second parasitic scattering element are configured to modify the radiation patterns and isolate the first antenna port and the second antenna port from one another.

Example 2 includes the subject matter of Example 1, wherein the first antenna port and the second antenna port further configured to generate the radiation correlation of the mutual coupling in response to the first antenna element and the second antenna element configured to couple to the first antenna port and the second antenna port during a dipole mode of operation.

Example 3 includes the subject matter of any of Examples 1-2, including or omitting any elements, wherein the first parasitic scattering element and the second parasitic scattering element further configured to modify the radiation patterns of the mutual coupling in response to the first antenna element and the second antenna element configured to couple to the first antenna port and the second antenna port during a dipole mode of operation by changing a radiation mode of the first antenna element and the second antenna element from a vertical radiation mode to a diagonal radiation mode.

Example 4 includes the subject matter of any of Examples 1-3, including or omitting any elements, further comprising: a multi-band wireless communication terminal comprising a size smaller than a wavelength of a lowest operation frequency divided by three.

Example 5 includes the subject matter of any of Examples 1-4, including or omitting any elements, wherein the first parasitic scattering element and the second parasitic scattering element each comprise a capacitive component or an inductive component of the ground plane configured to isolate the first antenna element and the second antenna element from one another within a same frequency range and comprises an electrical size that is about equal to a self-resonance.

Example 6 includes the subject matter of any of Examples 1-5, including or omitting any elements,1, wherein the first antenna port and the second antenna port are configured to operate at frequency division duplex LTE frequency bands in a dipole mode of radiating during a simultaneous reception and transmission of communication signals on at least two frequencies.

Example 7 includes the subject matter of any of Examples 1-6, including or omitting any elements, wherein the first antenna element and the second antenna element comprise a monopole MIMO antennas or other antennas, configured to excite a dipole mode with the chassis.

Example 8 includes the subject matter of any of Examples 1-7, including or omitting any elements, wherein the first parasitic scattering element and the second parasitic scattering element each comprise a capacitive component comprising one or more capacitors configured to match a corresponding impedance of the first antenna element and the second antenna element, suppress the mutual coupling between the first antenna element and the second antenna element, and change a radiation pattern derived from the first antenna element and the second antenna element, by generating an additional current path along the ground plane of the chassis.

Example 9 includes the subject matter of any of Examples 1-8, including or omitting any elements, wherein the first parasitic scattering element is configured to operate according to a downlink band while the second parasitic scattering element is configured to operate according to an uplink band for the LTE wireless communication signals.

Example 10 is a mobile device comprising: a first antenna port coupled to a first antenna element and configured to receive or transmit at a first resonant frequency based on the coupling of the first antenna port to the first antenna element; a second antenna port coupled to a second antenna element and configured to receive or transmit at a second resonant frequency based on the coupling of the second antenna port to the second antenna element, wherein the first antenna element and the second antenna element share a mutual coupling during frequency division duplex communication processing; a first parasitic scattering element, coupled to the first antenna port, configured to generate a plurality of coupling paths between a plurality of monopoles created by resonances of the first antenna element and the second antenna element in a dipole radiation mode of operation; and a second parasitic scattering element, coupled to the second antenna port, and configured to isolate a resonance of the second antenna element from the first antenna element.

Example 11 includes the subject matter of Example 10, wherein the first parasitic scattering element and the second parasitic scattering element are configured to change one or more radiation patterns of resonance by changing the mutual coupling of the first antenna port and the second antenna port.

Example 12 includes the subject matter of any of Examples 10-11, including or omitting any elements, wherein the first parasitic scattering element is further configured to change a radiation mode of the first antenna element or the second antenna element from a vertical radiation mode to a diagonal radiation mode of operation.

Example 13 includes the subject matter of any of Examples 10-12, including or omitting any elements, further comprising a chassis comprising a ground plane, wherein the first antenna element comprises a first monopole antenna located in a first volume on one side of the chassis and the second antenna element comprises a second monopole antenna located in a second volume on an opposite side of the chassis.

Example 14 includes the subject matter of any of Examples 10-13, including or omitting any elements, wherein the first parasitic scattering element and the second parasitic scattering element each comprise a capacitive component or an inductive component of the ground plane configured to isolate the first antenna element and the second antenna element from one another within a same frequency range and comprises an electrical size that is about equal to a self-resonance.

Example 15 includes the subject matter of any of Examples 10-14, including or omitting any elements, wherein the first antenna port and the second antenna port are configured to operate at frequency division duplex LTE frequency bands in a dipole mode of radiating during a simultaneous reception of communication signals at the first resonant frequency and transmission of communication signals at the second resonant frequency, and wherein the first antenna element and the second antenna element comprise a monopole MIMO antenna or other antenna, configured to excite a dipole mode.

Example 16 includes the subject matter of any of Examples 10-15, including or omitting any elements, wherein the first parasitic scattering element and the second parasitic scattering element each comprise a capacitive component comprising one or more capacitors configured to be tunable to match a corresponding impedance of the first antenna element and the second antenna element, suppress the mutual coupling between the first antenna element and the second antenna element, and change a radiation pattern derived from the first antenna element and the second antenna element.

Example 17 includes the subject matter of any of Examples 10-16, including or omitting any elements, wherein the first parasitic scattering element and the second parasitic scattering element are further configured to generate a first current path along the ground plane of the chassis and through the first parasitic scattering element and the second parasitic scattering element in conjunction with a second current path through along the ground plane between the first antenna element and the second antenna element, each comprising a monopole antenna or other antenna, configured to excite a dipole mode.

Example 18 includes the subject matter of any of Examples 10-17, including or omitting any elements, wherein the first parasitic scattering element and the second parasitic scattering element are each configured to serve one channel, the first parasitic scattering element being configured to serve a downlink band while the second parasitic scattering element being configured to serve an uplink band for long term evolution (LTE) wireless communication signals.

Example 19 is a method adapted for frequency reconfigurable antenna decoupling used in a mobile communication device, the method comprising: operating a first monopole antenna element of a transmission path to generate a first radiation pattern; operating, concurrent to the first monopole antenna element, a second monopole antenna element of a reception path to generate a second radiation pattern that forms a mutual coupling with the first radiation pattern; and modifying a radiation pattern of the first monopole antenna element or the second monopole antenna element by generating an additional current path via a parasitic scattering element along a ground plane along with a current path coupling the first monopole antenna element and the second monopole antenna element.

Example 20 includes the subject matter of Example 19, including or omitting any elements, further comprising: generating a capacitive element via one or more capacitive elements of the parasitic scattering element to alter at least one of the first or second radiation pattern from a vertical radiation pattern or a horizontal radiation pattern to a diagonal radiation pattern.

Example 21 includes the subject matter of any of Examples 19-20, including or omitting any elements, further comprising: matching an impedance of the first monopole antenna element and the second monopole antenna element via a first parasitic scattering element coupled to the first monopole antenna element and a second parasitic scattering element coupled to the second monopole antenna element; and suppressing the mutual coupling between the first monopole antenna element and the second monopole antenna element via one of the first parasitic scattering element or the second parasitic scattering element.

Example 22 includes the subject matter of any of Examples 19-21, including or omitting any elements, further comprising: operating the first parasitic scattering element according to one channel comprising a downlink band; and operating the second parasitic scattering element according to another channel comprising an uplink band.

Example 23 includes the subject matter of any of Examples 19-22, including or omitting any elements, further comprising: generating a capacitive element via one or more capacitors of the parasitic scattering element to alter the first radiation pattern from a dipole mode with a chassis to a monopole mode based on one or more changes in the mutual coupling.

Example 24 is an apparatus employed in a mobile device, comprising: means for operating a first monopole antenna element of a transmission path to generate a first radiation pattern; means for operating, concurrent to the first monopole antenna element, a second monopole antenna element of a reception path to generate a second radiation pattern that forms a mutual coupling with the first radiation pattern; and means for altering a radiation pattern of the first monopole antenna element or the second monopole antenna element by generating an additional current path via a parasitic scattering element along a ground plane along with a current path coupling the first monopole antenna element and the second monopole antenna element.

Example 25 includes the subject matter of Example 24, including or omitting any elements, further comprising: means for generating a capacitive element via one or more capacitive elements of the parasitic scattering element to alter at least one of the first or second radiation pattern from a vertical radiation pattern or a horizontal radiation pattern to a diagonal radiation pattern.

Example 26 includes the subject matter of any of Examples 24-25, including or omitting any elements, further comprising: means for matching an impedance of the first monopole antenna element and the second monopole antenna element via a first parasitic scattering element coupled to the first monopole antenna element and a second parasitic scattering element coupled to the second monopole antenna element; and suppressing the mutual coupling between the first monopole antenna element and the second monopole antenna element via one of the first parasitic scattering element or the second parasitic scattering element.

Example 27 includes the subject matter of any of Examples 24-26, including or omitting any elements, further comprising: means for operating the first parasitic scattering element according to one channel comprising a downlink band; and means for operating the second parasitic scattering element according to another channel comprising an uplink band.

Example 28 includes the subject matter of any of Examples 24-27, including or omitting any elements, further comprising: means for generating a capacitive element via one or more capacitors of the parasitic scattering element to alter the first radiation pattern from a dipole mode with a chassis to a monopole mode based on one or more changes in the mutual coupling.

Applications (e.g., program modules) can include routines, programs, components, data structures, etc., that perform particular tasks or implement particular abstract data types. Moreover, those skilled in the art will appreciate that the operations disclosed can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated mobile or personal computing devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media (e.g., one or more data stores) can include, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques, such as millimeter wave bands in the range of 30 GHz to 300 GHz, for example.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. A system adapted to transmit and receive long term evolution (LTE) wireless communication signals used in a multiple-input multiple-output (MIMO) network device, the system comprising:
a chassis comprising a volume comprising a ground plane;

a first antenna port configured to be in the volume of the chassis, coupled to the ground plane, and coupled to a first antenna element, wherein the first antenna port is further configured to operate within a first resonant frequency range;

a second antenna port configured to be in the volume of the chassis and on the opposite side of the first antenna port, coupled to the ground plane, and mutually coupled to a second antenna element, wherein the second antenna port is further configured to operate within a second resonant frequency range that enable the second antenna element to generate a radiation correlation of a mutual coupling of radiation patterns from the first antenna port and the second antenna port with the first antenna element and the second antenna element, respectively;

a first parasitic scattering element operably coupled to the first antenna port; and a second parasitic scattering element operably coupled to the second antenna port;

wherein the first parasitic scattering element and the second parasitic scattering element are configured to modify the radiation patterns and isolate the first antenna element and the second antenna port from one another in response to being coupled to the first antenna port and the second antenna port and wherein the first parasitic scattering element is configured to operate according to a downlink band while the second parasitic scattering element is configured to operate according to an uplink band for frequency division duplex operation of frequency bands.

2. The system of claim 1, wherein the first antenna port and the second antenna port further configured to generate the radiation correlation of the mutual coupling in response to the first antenna element and the second antenna element configured to couple to the first antenna port and the second antenna port during a dipole mode of operation.

3. The system of claim 1, wherein the first parasitic scattering element and the second parasitic scattering element further configured to modify the radiation patterns of the mutual coupling in response to the first antenna element and the second antenna element configured to couple to the first antenna port and the second antenna port during a dipole mode of operation by changing a radiation mode of the first antenna element and the second antenna element from a vertical radiation mode to a diagonal radiation mode.

4. The system of claim 1, further comprising:

a multi-band wireless communication terminal comprising a size smaller than a wavelength of a lowest operation frequency divided by three.

5. The system of claim 1, wherein the first parasitic scattering element and the second parasitic scattering element each comprise a capacitive component or an inductive component of the ground plane configured to isolate the first antenna element and the second antenna element from one another within a same frequency range and comprises an electrical size that is about equal to a self-resonance.

6. The system of claim 1, wherein the first antenna port and the second antenna port are configured to operate at frequency division duplex LTE frequency bands in a dipole mode of radiating during a simultaneous reception and transmission of communication signals on at least two frequencies.

7. The system of claim 1, wherein the first antenna element and the second antenna element comprise a monopole MIMO antennas or other antennas, configured to excite a dipole mode with the chassis.

8. The system of claim 1, wherein the first parasitic scattering element and the second parasitic scattering element each comprise a capacitive component comprising one or more capacitors configured to match a corresponding impedance of the first antenna element and the second antenna element, suppress the mutual coupling between the first antenna element and the second antenna element, and change a radiation pattern derived from the first antenna element and the second antenna element, by generating an additional current path along the ground plane of the chassis.

9. A mobile device comprising:

a first antenna port coupled to a first antenna element and configured to receive or transmit at a first resonant frequency based on the coupling of the first antenna port to the first antenna element;

a second antenna port coupled to a second antenna element and configured to receive or transmit at a second resonant frequency based on the coupling of the second antenna port to the second antenna element, wherein the first antenna element and the second antenna element share a mutual coupling during frequency division duplex communication processing;

a first parasitic scattering element, coupled to the first antenna port, configured to generate a plurality of coupling paths between a plurality of monopoles created by resonances of the first antenna element and the second antenna element in a dipole radiation mode of operation; and a second parasitic scattering element, coupled to the second antenna port, and configured to isolate a resonance of the second antenna element from the first antenna element;

wherein the first parasitic scattering element is further configured to change a radiation mode of the first antenna element or the second antenna element from a vertical radiation mode to a diagonal radiation mode of operation.

10. The mobile device of claim 9, wherein the first parasitic scattering element and the second parasitic scattering element are configured to change one or more radiation patterns of resonance by changing the mutual coupling of the first antenna port and the second antenna port.

11. The mobile device of claim 9, further comprising a chassis comprising a ground plane, wherein the first antenna element comprises a first monopole antenna located in a first volume on one side of the chassis and the second antenna element comprises a second monopole antenna located in a second volume on an opposite side of the chassis.

12. The mobile device of claim 11, wherein the first parasitic scattering element and the second parasitic scattering element each comprise a capacitive component or an inductive component of the ground plane configured to isolate the first antenna element and the second antenna element from one another within a same frequency range and comprises an electrical size that is about equal to a self-resonance.

13. The mobile device of claim 11, wherein the first antenna port and the second antenna port are configured to operate at frequency division duplex LTE frequency bands in a dipole mode of radiating during a simultaneous reception of communication signals at the first resonant frequency and transmission of communication signals at the second resonant frequency, and wherein the first antenna element and the second antenna element comprise a monopole MIMO antenna or other antenna, configured to excite a dipole mode.

14. The mobile device of claim 11, wherein the first parasitic scattering element and the second parasitic scattering element each comprise a capacitive component comprising one or more capacitors configured to be tunable to match a corresponding impedance of the first antenna element and the second antenna element, suppress the mutual coupling between the first antenna element and the second antenna element, and change a radiation pattern derived from the first antenna element and the second antenna element.

15. The mobile device of claim 14, wherein the first parasitic scattering element and the second parasitic scattering element are further configured to generate a first current path along the ground plane of the chassis and through the first parasitic scattering element and the second parasitic scattering element in conjunction with a second current path through along the ground plane between the first antenna element and the second antenna element, each comprising a monopole antenna or other antenna, configured to excite a dipole mode.

16. The mobile device of claim 11, wherein the first parasitic scattering element and the second parasitic scattering element are each configured to serve one channel, the first parasitic scattering element being configured to serve a downlink band while the second parasitic scattering element being configured to serve an uplink band for long term evolution (LTE) wireless communication signals.

* * * * *